US012777354B2

(12) United States Patent
Esswie et al.

(10) Patent No.: US 12,777,354 B2
(45) Date of Patent: Oct. 27, 2026

(54) PROACTIVE SIGNALING OF PREDICTED EXTENDED REALITY USER BEHAVIOR

(71) Applicant: Dell Products, L.P., Round Rock, TX (US)

(72) Inventors: Ali Esswie, Calgary (CA); Ibrahim Abu Alhaol, Nepean (CA)

(73) Assignee: Dell Products L.P., Round Rock, TX (US)

( * ) Notice: Subject to any disclaimer, the term of this patent is extended or adjusted under 35 U.S.C. 154(b) by 279 days.

(21) Appl. No.: 18/521,831

(22) Filed: Nov. 28, 2023

(65) Prior Publication Data

US 2025/0175832 A1 May 29, 2025

(51) Int. Cl.
*H04W 24/10* (2009.01)
*H04L 67/131* (2022.01)

(52) U.S. Cl.
CPC ........... *H04W 24/10* (2013.01); *H04L 67/131* (2022.05)

(58) Field of Classification Search
None
See application file for complete search history.

(56) References Cited

U.S. PATENT DOCUMENTS

| | | | | |
|---|---|---|---|---|
| 2014/0113611 | A1 | 4/2014 | Ye | |
| 2022/0095225 | A1* | 3/2022 | Kim | H04W 52/0209 |
| 2024/0161412 | A1* | 5/2024 | Jia | G06F 3/011 |
| 2024/0422511 | A1* | 12/2024 | Rao | H04W 4/08 |
| 2025/0150511 | A1* | 5/2025 | Hatfield | H04L 67/56 |

FOREIGN PATENT DOCUMENTS

| | | |
|---|---|---|
| EP | 4 030 847 | 7/2022 |
| WO | 2019/120503 | 6/2019 |

OTHER PUBLICATIONS

International Search Report and Written Opinion mailed Sep. 10, 2024 for PCT Application No. PCT/US2024/013892, 15 pages.
Notification Concerning Transmittal of International Preliminary Report on Patentability mailed Jun. 11, 2026 for PCT Application No. PCT/US2024/013892, 9 pages.
European Office Action mailed Jul. 7, 2026 for European Patent Application No. 24707646.6, 3 pages.

* cited by examiner

*Primary Examiner* — Diane L Lo
(74) *Attorney, Agent, or Firm* — Amin, Turocy & Watson, LLP

(57) ABSTRACT

An extended reality processing unit may receive from a radio access network node a user characteristic reporting configuration comprising a user characteristic indication indicative of a user characteristic, corresponding to use of an extended reality appliance during an extended reality session, that can potentially be predicted by the processing unit. The node may request, via a configuration message, reporting to the node a prediction of a user characteristic associated with the session. The request message may comprise a reporting criterion. Based on traffic corresponding to the session, the processing unit may predict values indicative of one or more user characteristics associated with the session. Upon determining that a predicted value satisfies a reporting criterion, the processing unit may transmit to the node the predicted value. The node may adjust allocation of resources usable for delivery of traffic associated with the session based on the reported predicted value.

20 Claims, 16 Drawing Sheets

900

XR user characteristic reporting configuration

| Indication | User behavior/characteristic |
|---|---|
| 0 | Pose tracking |
| 1 | Orientation tracking |
| : | : |
| n | Eye flips |

A
B
n
405
410

305

FIG. 4

User behavior/characteristic report

| | End XR appliance ID | User behavior indication/index | Value | Validity period (ms or slots) |
|---|---|---|---|---|
| A | $y_1$ | 0 | 45 degrees | $x_1$ |
| B | $y_2$ | 1 | 15 degrees | $x_2$ |
| | : | : | : | : |
| n | $y_k$ | n | Eye flip: True (1) | $x_n$ |
| | 605 | 610 | 615 | 620 |

325

FIG. 6

XR appliance data usable by DT to facilitate predicting user behavior/characteristic metrics

410

| Data Category | Data Types/Details | Purpose for DT |
|---|---|---|
| **User Interaction Metrics** | - Eye Tracking<br>- Head Movement<br>- Hand/Finger Tracking<br>- Pose Estimation<br>-etc | Infer user attention, engagement, and navigation within XR |
| **System & Application Metrics** | - Application Usage<br>- System Performance<br>- Audio Interactions<br>-etc | Understand system response and application preferences. |
| **Environmental Sensors** | - Ambient Light<br>- Proximity Sensors<br>-etc | Gauge user preferences and physical space interactions |
| **Historical Data** | - Past Interaction Patterns<br>- Feedback and Preferences | Provide patterns and baselines for prediction. |
| **External Factors** | - Time and Date<br>- Others | Offer insights into usage patterns and potential future interactions |

1600

FIG. 16

PROACTIVE SIGNALING OF PREDICTED EXTENDED REALITY USER BEHAVIOR

BACKGROUND

The 'New Radio' (NR) terminology that is associated with fifth generation mobile wireless communication systems ("5G") refers to technical aspects used in wireless radio access networks ("RAN") that comprise several quality of service classes (QoS), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary. A RAN node may activate a network energy saving mode to reduce power consumption.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method may comprise facilitating, by a user equipment comprising a processor, receiving, from a radio access network node, a user characteristic reporting configuration comprising at least one user characteristic indication indicative of at least one user characteristic and facilitating, by the user equipment, receiving, from the radio access network node, a user characteristic reporting request comprising at least one characteristic of the at least one user characteristic indicated by the at least one user characteristic indication. The method may further comprise determining, by the user equipment, at least one user action indication indicative of at least one user action corresponding to at least one of the at least one characteristic of the at least one user characteristic indicated by the user characteristic reporting request. The user action indication may be determined based on user action during an XR session, wherein a user operates an XR appliance, and the user action indication may comprise a prediction, or a predicted value, indicative of future user action corresponding to at least one of the at least one characteristic of the at least one user characteristic indicated by the user characteristic reporting request. Responsive to receiving the user characteristic reporting request, the method may further comprise facilitating, by the user equipment, transmitting, to the radio access network node, a user characteristic report comprising the at least one user action indication.

The at least one user action indication may be usable by the radio access network node to schedule resources accommodative of delivery of traffic corresponding to the at least one user action.

In an embodiment, the user characteristic reporting request may comprise at least one confidence level indication indicative of at least one confidence level criterion corresponding to the at least one user characteristic indication. The method may further comprise determining, by the user equipment, the at least one user characteristic according to satisfaction of the at least one confidence level criterion to result in at least one determined user characteristic. The transmitting of the user characteristic report is based on the at least one determined user characteristic satisfying the at least one confidence level criterion corresponding to the at least one user characteristic. The user characteristic reporting request may comprise at least one configured user characteristic indication duration indication indicative of at least one configured user characteristic indication validity period length during which the at least one confidence level criterion is to be valid with respect to the at least one determined user characteristic. The user characteristic report may further comprise at least one actual user characteristic indication duration indication indicative of at least one user characteristic indication validity period indication indicative of at least one user characteristic indication validity period during which the at least one confidence level criterion is valid with respect to the at least one determined user characteristic. The at least one user characteristic indication validity period indicated in the user characteristic report may be less than the at least one configured user characteristic indication validity period length. In an embodiment, the at least one user characteristic indication validity period indicated in the user characteristic report may be greater than the at least one configured user characteristic indication validity period length.

In an embodiment, the user characteristic reporting configuration may be generated by an extended reality (XR) server. In an embodiment, the user characteristic reporting configuration may be generated by the radio access network node based on information received from the user equipment.

In an embodiment, the method may further comprise facilitating, by the user equipment, transmitting, to the radio access network node, at least one user characteristic capability indication indicative of at least one user characteristic capability, with respect to the user equipment, to report the at least one characteristic of the at least one user characteristic indication requested via the user characteristic reporting request. The user equipment may comprise a digital twin module to facilitate determining the at least one user characteristic capability. The user equipment may be communicatively coupled with a digital twin module to facilitate determining the at least one user characteristic capability.

In an embodiment, an extended reality (XR) appliance may comprise the user equipment.

In an embodiment, the user equipment may be a component of an extended reality (XR) processing unit communicatively coupled with an XR appliance.

In an embodiment, the at least one user characteristic corresponds to at least one action result resulting from performance of at least one action with respect to use of an extended reality (XR) user interface. The at least one action result may comprise at least one of: a specified pose orientation, a level orientation, a target acceleration, a target velocity, a specified hand orientation of the user, an eye blink, a target eye blink rate, or a specified orientation with respect to a three-dimensional space.

In an embodiment, the determining of the at least one user action indication may comprise receiving, from an extended reality (XR) appliance, the at least one user action indication.

In another example embodiment, an extended reality (XR) processing unit may comprise a processor configured to process executable instructions that, when executed by the processor, facilitate performance of operations, comprising receiving, from a radio network node, a user characteristic reporting configuration comprising at least one user characteristic indication indicative of at least one user characteristic and receiving, from the radio network node, a user characteristic reporting request, comprising at least one characteristic of the at least one user characteristic indicated by the at least one user characteristic indication and at least one confidence level indication indicative of at least one confidence level criterion corresponding to the at least one user characteristic indication. The user characteristic reporting request may be received in the form of a configuration message and the at least one confidence level indication may be configured to the XR processing unit to be usable thereby to trigger reporting of a predicted user action when a confidence level corresponding to predicting, by the XR processing unit, of the predicted user action satisfies the at least one confidence level indication. The operations may further comprise determining at least one user action prediction indication indicative of at least one predicted user action corresponding to at least one of the at least one characteristic of the at least one user characteristic indicated by the user characteristic reporting request. Responsive to receiving the user characteristic reporting request and based on the at least one user action prediction indication satisfying the at least one confidence level criterion corresponding to the at least one characteristic, transmitting a user characteristic report comprising the at least one user action indication.

The operations may comprise transmitting, to the radio network node, at least one user characteristic capability indication indicative of at least one user characteristic capability, with respect to the user equipment, to determine the at least one user action prediction indication. In an embodiment, the at least one user action prediction indication may be determined by a digital twin module.

In yet another example embodiment, a non-transitory machine-readable medium may comprise executable instructions that, when executed by a processor of an extended reality (XR) processing unit, facilitate performance of operations, comprising receiving, from a radio network node, a user characteristic reporting configuration comprising at least one user characteristic indication indicative of at least one user characteristic and receiving, from the radio network node, a user characteristic reporting request comprising at least one indication of the at least one user characteristic indication, wherein the user characteristic reporting request comprises at least one confidence level indication indicative of at least one confidence level criterion corresponding to the at least one user characteristic indication. The operations may further comprise receiving, from an XR appliance, at least one user action indication indicative of at least one user action corresponding to at least one of the at least one user characteristic indicated by the user characteristic reporting request. Based on the at least one user action indication, the operations may further comprise determining at least one user characteristic prediction that satisfies the at least one confidence level criterion to result in a user characteristic prediction satisfaction result. Responsive to receiving the user characteristic reporting request, the operations may further comprise transmitting, to the radio network node, a user characteristic report comprising the user characteristic prediction satisfaction result.

In an embodiment, the user characteristic report may further comprise at least one actual user characteristic indication duration indication indicative of at least one user characteristic prediction validity period during which the at least one confidence level criterion is valid with respect to the user characteristic prediction satisfaction result.

In an embodiment, the operations may further comprise transmitting, to the radio network node, at least one user characteristic capability indication indicative of at least one user characteristic capability, with respect to XR appliance, to report to the XR processing unit the at least one of the at least one user characteristic indication indicated by the user characteristic reporting configuration.

BRIEF DESCRIPTION OF THE DRAWINGS

FIG. 4 illustrates an example user characteristic reporting configuration.

FIG. 6 illustrates an example user characteristic report.

FIG. 16 illustrates example XR appliance data usable by a digital twin module to facilitate predicting user behavior characteristics.

DETAILED DESCRIPTION

Figure 1:
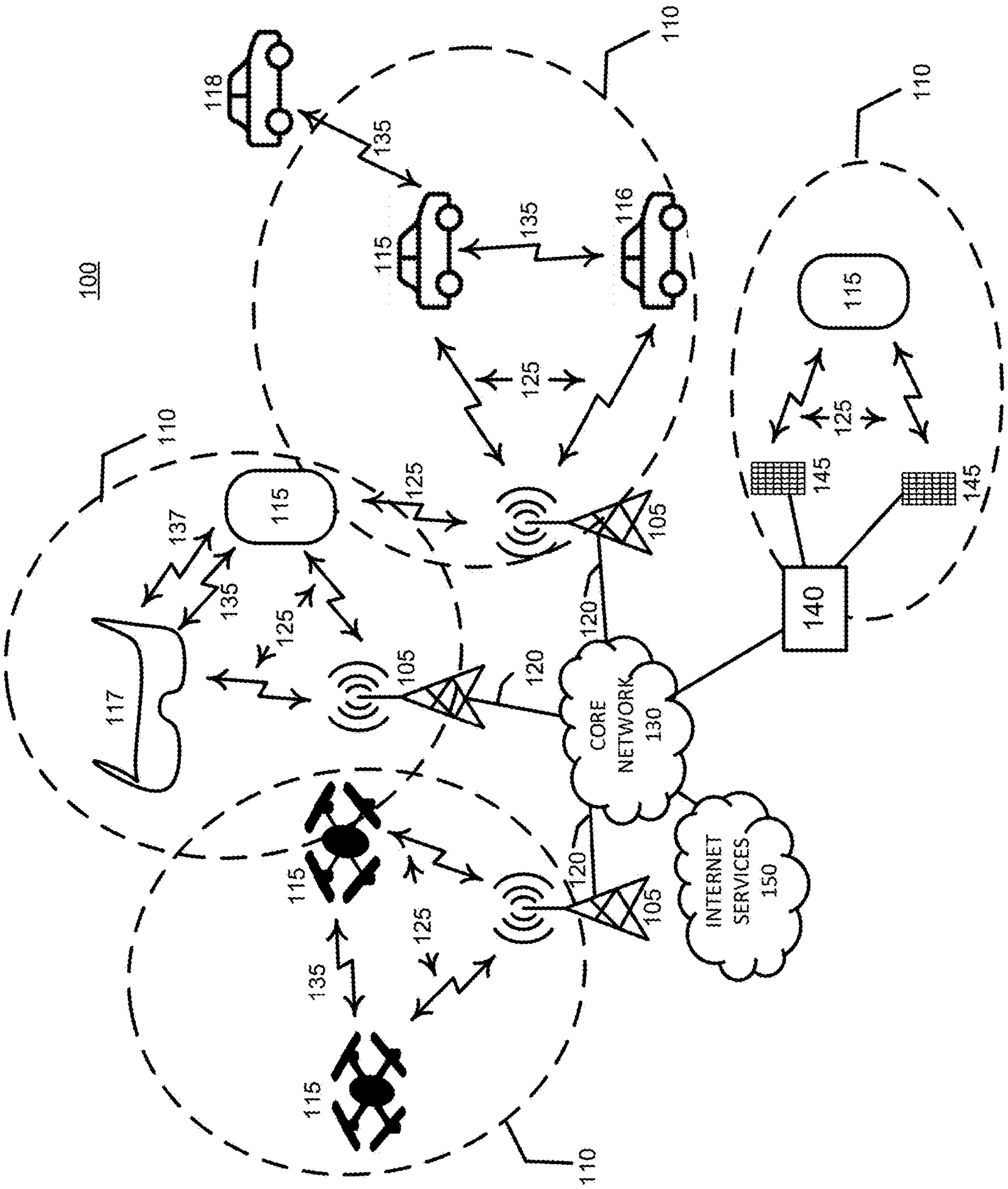
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms “component,” “system” and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. In yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term “facilitate” as used herein is in the context of a system, device or component “facilitating” one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term “article of manufacture” as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

As an example use case that illustrates example embodiments disclosed herein, Virtual Reality (“VR”) applications and VR variants, (e.g., mixed and augmented reality) may at some time perform best when using NR radio resources associated with URLLC while at other times lower performance levels may suffice. A virtual reality smart glass device may consume NR radio resources at a given broadband data rate having more stringent radio latency and reliability criteria to provide a satisfactory end-user experience.

5G systems should support ‘extended reality’ (“XR”) services. XR services may be referred to as anything reality services. XR services may comprise VR applications, which are widely adopted XR applications that provide an immersive environment that can stimulate the senses of an end user such that he, or she, may be ‘tricked’ into the feeling of being within a different environment than he, or she, is actually in. XR services may comprise Augmented Reality (‘AR’) applications that may enhance a real-world environment by providing additional virtual world elements via a user’s senses that focus on real-world elements in the user’s actual surrounding environment. XR services may comprise Mixed reality cases (“MR”) applications that help merge, or bring together, virtual and real worlds such that an end-user of XR services interacts with elements of his, or her, real environment and virtual environment simultaneously. As used herein, a reference to ‘XR’ may be a reference to VR, AR, or MR.

Different XR use cases may be associated with certain radio performance targets. Common to XR cases, and unlike URLLC or eMBB, high-capacity links with stringent radio and reliability levels are typically needed for a satisfactory end user experience. For instance, compared to a 5 Mbps URLLC link with a 1 ms radio budget, some XR applications need 100 Mbps links with a couple of milliseconds of allowed radio latency. Thus, 5G radio design and associated procedures may be adapted to the new XR QoS class and associated performance targets.

An XR service may be facilitated by traffic having certain characteristics associated with the XR service. For example, XR traffic may typically be periodic with time-varying packet size and packet arrival rate. In addition, different packet traffic flows of a single XR communication session may affect an end user's experience differently. For instance, a smart glass that is streaming 180-degree high-resolution frames may use a large percentage of a broadband service's capacity for fulfilling a user experience. However, frames that are to be presented to a user's pose direction (e.g., front direction) are the most vital for an end user's satisfactory user experience while frames to be presented to a user's periphery vision have less of an impact on a user's experience and thus may be associated with a lower QoS requirement for transport of traffic packets as compared to a QoS requirement for transporting the pose-direction traffic flow. Therefore, flow differentiation that prioritizes some flows, or some packets, of a XR session over other flows or packets may facilitate efficient use of a communication system's capacity to deliver the traffic. Furthermore, XR capable devices (e.g., smart glasses, projection wearables, etc.) may be more power-limited than conventional mobile handsets due to the limited form factor of the devices. Thus, techniques to maximize power saving operation at an XR capable device is desirable. Accordingly, a user equipment device accessing XR services, or traffic flows of an XR session, may be associated with certain QoS parameter criterion/criteria to satisfy performance targets of the XR service. Measured traffic values, or metrics, may correspond to a QoS, or analyzed with respect to, parameter criterion/criteria, such as, for example, a data rate, an end-to-end latency, or a reliability.

High-capacity-demanding services, such as virtual reality applications, may present performance challenges to even 5G NR capabilities. Thus, even though 5G NR systems may facilitate and support higher performance capabilities, the radio interface should nevertheless be optimized to support extreme high capacity and low latency requirements of XR applications and XR data traffic.

Multi-modal XR applications may integrate different technologies to offer a versatile and comprehensive user experience. For example, a multi-modal XR application might use VR to immerse users in a virtual training environment and then seamlessly switch to AR or MR to provide real-time feedback or overlay instructional information corresponding to physical objects that may appear in an environment viewed by an XR user. Such feedback or instructional information may relate to stationary objects or may be information that does not change frequently and may be referred to as stable information.

An advantage of multi-modal XR applications is the adaptability to facilitate different contexts and different user preferences. An XR application can provide varying levels of immersion and interaction, allowing users to choose the most suitable mode of engagement based on the user's needs or the specific task at hand. Additionally, multi-modal XR can enable collaborative experiences, allowing users in different physical locations to interact within the same virtual space.

Uses of multi-modal XR applications extend beyond entertainment and gaming, with widespread adoption in fields such as healthcare, education, engineering, and marketing. Medical practitioners can use multi-modal XR applications to simulate complex surgeries, educators can create interactive and immersive learning experiences, and architects can visualize and modify building designs in real-time.

Turning now to the figures, FIG. 1 illustrates an example of a wireless communication system 100 that supports blind decoding of PDCCH candidates or search spaces in accordance with one or more example embodiments of the present disclosure. The wireless communication system 100 may include one or more base stations 105, one or more user equipment ("UE") devices 115, and core network 130. In some examples, the wireless communication system 100 may comprise a long-range wireless communication network, that comprises, for example, a Long-Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, laptop computers, tablet computers, automobiles or other vehicles, or drones or other aircraft. Another example of a UE may be a virtual reality/extended reality appliance 117, such as smart glasses, a virtual reality headset, an augmented reality headset, and other similar devices that may provide images, video, audio, touch sensation, taste, or smell sensation to a wearer. A UE, such as XR appliance 117, may transmit or receive wireless signals with a RAN base station 105 via a long-range wireless link 125, or the UE/XR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. XR appliance 117 may also communicate with a wireless UE via a cable, or other wired connection. An XR appliance 117 may offload processing functionality or functionality related to communicating with a RAN, to a user equipment 115, which may be referred to as an intermediate user equipment or an XR processing unit. An XR processing unit or a RAN, or a component thereof, may be implemented by one or more computer components that may be described in reference to FIG. 14.

Continuing with discussion of FIG. 1, base stations 105, which may be referred to as radio access network nodes or cells, may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one component carrier, or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications, such as sidelink communication, may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both. In FIG. 1, vehicle UE 116 is shown inside a RAN coverage area and vehicle UE 118 is shown outside the coverage area of the same RAN. Vehicle UE 115 wirelessly connected to the RAN may be a sidelink relay to in-RAN-coverage-range vehicle UE 116 or to out-of-RAN-coverage-range vehicle UE 118.

The core network 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW)

communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Configured grant scheduling is a type of uplink resource scheduling that facilitates minimizing scheduling latency, which is beneficial for delivery of latency stringent traffic (e.g., traffic packets corresponding to a low latency requirement/criterion). A radio network node may semi-statically configure one or more periodic resource sets or resource occasions for devices to adopt for transmitting latency-stringent uplink traffic arrivals. The configured periodic resource occasions may be referred to as configured grant ("CG") occasions. A CG resource occasion may correspond to assignment, or granting, of certain frequency resources for a certain amount of time that repeat periodically and that are usable for uplink traffic transmission. Accordingly, when a device facilitating latency-critical traffic has latency-critical uplink packet arrivals (e.g., arrived from an application or from another device), the device may immediately transmit the latency-critical packets during one or more next available CG occasions. Using CG resource occasions may facilitate avoiding traffic buffering delay resulting from a device having to first request a scheduling grant with an indication of how much uplink traffic is to be transmitted, receiving a resource grant, and finally transmitting the uplink traffic (e.g., CG scheduling may facilitate avoiding dynamic scheduling).

CG scheduling clearly offers fast transmission of uplink packets with less control overhead. However, since CG scheduling typically involves scheduling of resources at periodic occasions, CG scheduling is more efficient and beneficial when a packet arrival rate at a devices is almost periodic. For example, to achieve a high network spectral efficiency, a radio network node may align a CG resource occasion periodicity for occasions configured for a given device to align with an expected packet arrival rate at the device, thus maximizing a likelihood that CG resource set occasions are efficiently utilized. Furthermore, a CG resource set or occasion can be dedicated to a single device or may be shared among multiple active devices, wherein each device may be assigned an orthogonal scrambling code or preamble to modulate traffic with respect to a serving network node. Such orthogonal modulation may facilitate multiple devices simultaneously transmitting respective uplink traffic payload simultaneously via the same CG resource occasion and may facilitate the network node being able to distinguish and separately decode the individual traffic streams corresponding to the different transmitting devices.

Figure 2:
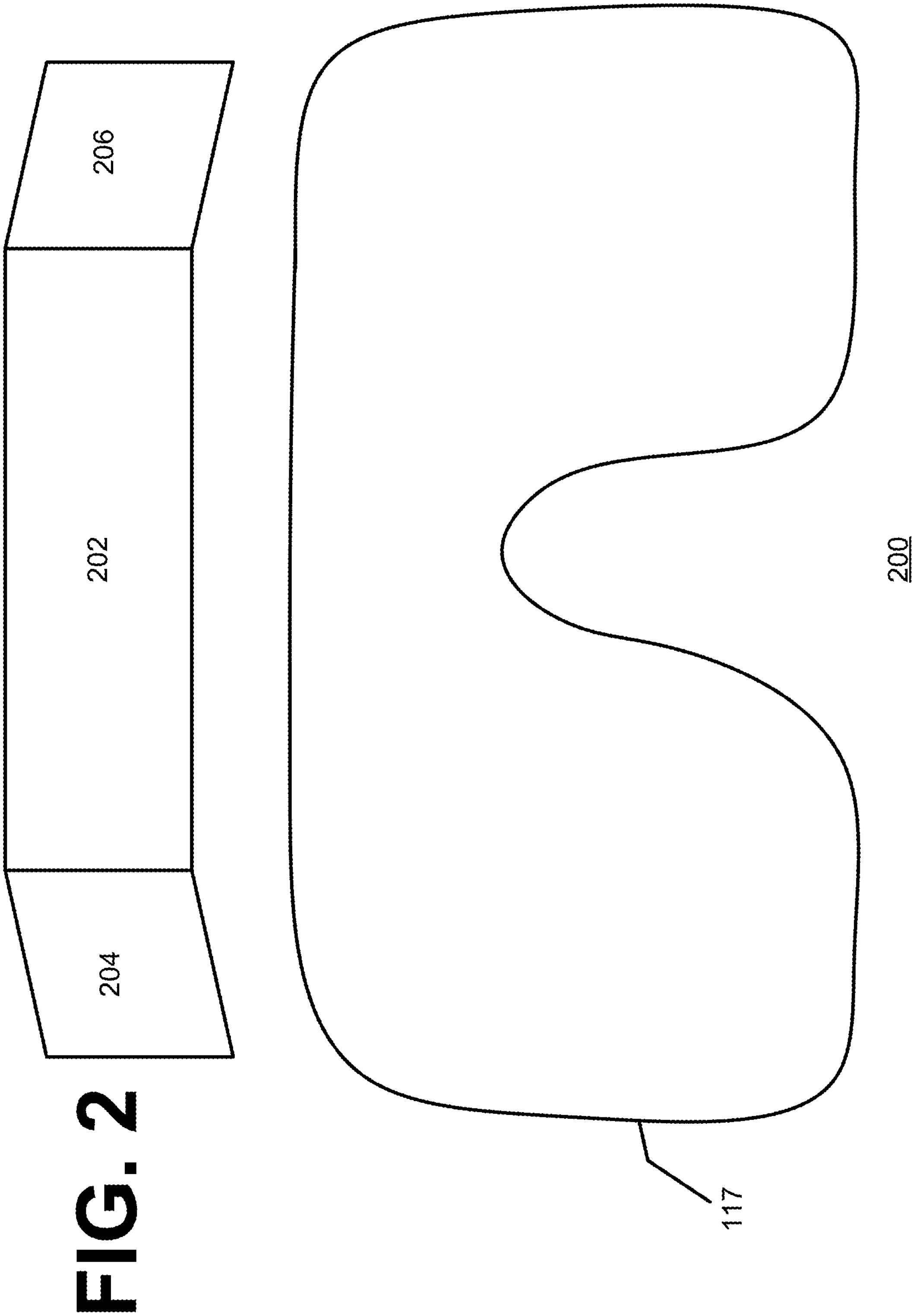
FIG. 2 illustrates an example virtual reality appliance.

Turning now to FIG. 2, the figure illustrates a virtual reality ("VR") application system 200. In system 200, wearable VR appliance 117 is shown from a wearer's, or viewer's, perspective. VR appliance 117 may comprise a center, or pose, visual display portion 202, a left visual display portion 204 and a right visual display portion 206, that may be used to display main visual information, left peripheral visual information, and right peripheral visual information, respectively. As shown in the figure, the portions 202, 204, and 206 are delineated by distinct lines, but it will be appreciated that hardware or software may facilitate gradual transition from main and peripheral information display.

As discussed above, different XR use cases may require different corresponding radio performance. Typically, for XR use cases but unlike for URLLC or eMBB use cases, high-capacity radio links that carry XR data traffic (e.g., data flows that comprise visual information) with stringent radio levels (e.g., latency) and reliability levels are required for a reasonable end user experience. For example, compared to a 5 Mbps URLLC link with a 1 ms radio latency budget, some XR applications require 100 Mbps links with about 2 mS allowed radio latency.

From research, several characteristics have been determined that for XR data traffic: (1) XR traffic characteristics are typically periodic with time-varying packet size and packet arrival rate; (2) XR capable devices may be more power-limited than conventional mobile handsets, (e.g., smart glasses, projection wearables, etc.) due to the limited form factor of the devices; (3) multiple data packet flows corresponding to different visual information of a given XR session are not perceived by a user as having the same impact on the end user experience.

Thus, in addition to needing XR-specific power use efficiency, smart glasses, such as wearable appliance 117, streaming 180-degree high-resolution frames requires broadband capacity for providing an optimum user experience. However, it has been determined that data corresponding to the frames that carry main, or center visual information (i.e., the pose or front direction) are the most vital for end user satisfaction, while the frames corresponding to peripheral visual information have a lesser impact on a user's experience. Therefore, accepting higher latency for less important traffic flows so that resources that would otherwise be allocated to the less important traffic flows can be used for traffic flows corresponding to more important traffic, or to devices that carry the more important traffic, may be used to optimize overall capacity and performance of a wireless communication system, such as a 5G communication system using NR techniques, method, systems, or devices. For example, a wireless data traffic flow carrying visual information for display on center, or pose, visual display portion 202 may be prioritized higher than a wireless data traffic flow carrying visual information for left visual display portion 204 or for right visual display portion 206.

The performance of a communication network in providing an XR service may be at least partially determined according to satisfaction of a user of the XR services. Each XR-service-using user equipment device may be associated with certain QoS parameter criterion/criteria with respect to which measured values, or metrics, corresponding to traffic flows that facilitate XR service may be analyzed. Adjusting scheduling of traffic such that a measured traffic flow metric satisfies a QoS parameter, such as, for example, a data rate, an end-to-end latency, or a reliability may be beneficial to a user's XR experience.

A 5G NR radio system typically comprises a physical downlink control channel ("PDCCH"), which may be used to deliver downlink and uplink control information to cellular devices. The 5G control channel may facilitate operation according to requirements of URLLC and eMBB use cases and may facilitate an efficient coexistence between such different QoS classes.

Multi-modal XR may be used in implementations of XR services. Multi-modal XR services may facilitate diverse use cases beyond XR gaming and XR entertainment services. For example, a multi-modal XR service may facilitate an application class for which multiple downlink-downlink or downlink-uplink traffic streams are correlated, or related, to each other. However, conventional techniques do not facilitate relative QoS enforcement between multiple traffic streams that are related. Instead, related traffic streams/flows are treated independently such that only an independent quality of service criterion corresponding to a given stream/flow may be enforced for the given stream/flow. Independent treatment of related traffic flow may result in sluggish and degraded performance of multi-modal XR applications.

A multi-modal XR application class may comprise applications wherein multiple downlink and/or uplink traffic streams, despite serving different XR viewing, control, or pose purposes, may be highly correlated, or highly related, to each other. Each traffic stream/flow may be associated with one or more independent QoS parameter criterion/criteria to be satisfied. However, each stream/flow, in reference to another, related, downlink or uplink traffic streams, may have a practical relative, or related, quality of service. For example, a RAN node should schedule for transmission a packet of a downlink traffic flow within a maximum delay criterion from a time when the RAN node receives a packet corresponding to a packet of a related traffic flow (uplink or downlink) to provide an improved user experience. Satisfactory delivery of a packet of a traffic flow (e.g., for purposes of discussion a target traffic flow) may depend on satisfaction of a relative QoS criterion (e.g., a relative delay, a relative reliability, or a relative data rate) with respect to reception or transmission of a packet of a relative traffic flow instead of being only dependent on satisfaction of an independent criterion corresponding to the target flow itself.

For example, for an educational XR application wherein a virtual object pops up in a user's XR appliance field of view when the user looks at or clicks at an associated real/virtual object in the field of view, a relative quality of service ("rQoS") (e.g., a relative tolerable delay budget) should be satisfied between an uplink traffic flow carrying the indication of the user looking or clicking on the real/virtual object and a respective downlink traffic flow carrying the corresponding virtual object to be popped up. In another example, uplink traffic transmitted by an XR appliance may be related to downlink traffic. In either case, if a delay between the uplink and downlink streams (or vice versa) is large the user experience may be severely impacted.

Multimodal traffic may comprise multiple same-direction and/or multiple cross-direction traffic flows (e.g., downlink traffic flows and uplink traffic flows) that are related to each other such that one or more relative quality of service (QoS) performance target(s)/requirement(s) corresponding to one of the flows must be satisfied to ensure satisfaction of a criterion corresponding to another flow and to deliver a smooth user experience. For example, an uplink traffic packet that is triggered, or generated, at a device based on receiving at the device a packet corresponding to a related multimodal downlink traffic flow, typically must be delivered to the serving RAN node, and thus typically must be scheduled for transmission, within a stringent latency budget with respect to a time when the triggering downlink traffic was received by the device.

Achieving a benefit from even the most latency-accommodative conventional uplink scheduling scheme, (e.g., configured grant ("CG") scheduling) typically depends on pre-allocating uplink resources to match an expected generation of, or availability of, respective uplink traffic that is related to the downlink traffic. However, uplink multimodal traffic typically corresponds to related downlink traffic, which may not be periodic, rather than being based on being independently, predictably, and periodically generated or available for uplink transmission. Accordingly, embodiments disclosed herein may comprise uplink CG scheduling of multimodal uplink traffic that facilitates satisfaction of inter-traffic-flow(s) relative QoS target(s) in a spectrally efficient manner.

In an embodiment, a user equipment may be deployed as an extended reality processing unit and may facilitate communication with a RAN node on behalf of a less capable end XR appliance (e.g., less capable in terms of processing power, battery capacity, transmitter power, or the like). An extended reality processing unit may comprise an 'in-box' processing unit/device that facilitates signaling, traffic handling, and overall radio assistance to an end XR appliance (e.g., helmets, or glasses), which may be capable of communicating directly with a RAN node but with reduced capability. Accordingly, an intermediate XR processing unit (e.g., a laptop or smartphone that is intermediate with respect to communication links between a RAN node and an end XR appliance) may facilitate relaxing a large subset of radio operations, traffic processing, and battery consumption load with respect to an end XR appliance thus leading to a more efficient end XR device design (e.g., requiring less battery size, dissipating less heat, etc.).

It is desirable for a RAN node to identify XR traffic corresponding to a given XR application to facilitate optimizing scheduling policies based on the XR traffic, thus increasing efficiency of network resource capacity use and network energy efficiency, which may be accomplished by the RAN node sleeping, or shutting down, transceivers without negatively impacting XR performance. For many interactive XR applications, human user behavior corresponding to different users, in terms of, for example, user XR appliance pose orientation patterns, user mobility, a user's hand directivity, or user eye flip(s), may significantly impact traffic and network behaviors differently from one user to another. For example, a young, energetic XR user may change XR glass/appliance pose direction quickly, which may lead the XR appliance being used by the young user to trigger frequent uplink control signaling transmissions carrying pose position updates and to request faster downlink traffic scheduling as compared to another user (e.g., a young user may correspond to an increased mean value of requested downlink traffic). Actions by a human user using an XR appliance may deviate from pre-determined traffic characteristics and may be 'unknown' to a RAN node (e.g., the RAN node is neither aware of nor has any predictive intelligence relative to a user's short term XR user behavior corresponding to user behavior), and accordingly, using conventional techniques the RAN node is unable to optimize scheduling policies and energy saving measures with respect to end XR user actions.

Digital Twin ("DT")

A digital twin, which may be conceptualized as a virtual replica of a physical system, can potentially offer transformative insight into system and user behaviors, diagnostics, and predictive analyses with respect to numerous technology sectors. With respect to extended reality, a DT may facilitate understanding user behaviors to optimize resource usage and energy efficiency measures. The immersive nature of XR, characterized by real-time interactions and enriched visual experiences, suggests that a DT can be a suitable platform for monitoring user interactions. Beyond the promise of enhancing user experience, there is also the potential for prolonging battery life corresponding to an XR appliance and improving the appliance's energy usage efficiency.

A DT can capture a spectrum of user behavior characteristic metrics in an XR context, from pose and orientation to eye flips and clicks. Considering benefits of 5G and future generations of wireless communication, such as Ultra-Reliable Low-Latency Communication (URLLC) and enhanced Mobile Broadband (eMBB), the role of DTs might be even more significant. DTs may facilitate determining correlations between user behaviors, network requirements, and energy consumption patterns by simulating user behaviors in different scenarios. Predictive analytics embedded within these DT model may predict how changes in a radio network could impact XR user behaviors and energy footprints. Modeling XR user metrics by a DT may facilitate dynamic adjustment(s) of system parameters (e.g., parameters corresponding to a RAN node or to an XR appliance/headset) to improve user experience and energy consumption corresponding to use of the XR appliance/headset. Minimizing image rendering, or re-rendering, adjusting display brightness based on need, or optimizing data transfers corresponding to an XR session via a long-range wireless radio network may facilitate reducing energy consumption. Accordingly, use of DTs may not only enhance user experience but may also facilitate overall energy consumption by components of an XR ecosystem.

A DT can be beneficial in at least three ways: Modeling and Predicting User Behavior; Correlation with RAN Resources; or Optimizing Resource Utilization.

Modeling and Predicting User Behavior.

A DT can be trained to understand patterns in user characteristic behavior metrics. By analyzing historical data and discerning patterns or trends in how users interact within an XR environment, a DT may forecast, or predict, future user behaviors. For instance, if a user tends to increase their interaction with a specific XR module or application during certain times of the day or under specific conditions, a DT can predict this upswing and update an XR system (including a serving RAN node) accordingly.

Correlation with RAN Resources.

Beyond predicting user behavior characteristic behavior, a DT may generate information usable to facilitate a RAN node scheduling resources to accommodate anticipated/predicted user behaviors or actions. As XR experiences become more data-intensive, balance between delay (e.g., latency) and rate (e.g., data throughput) becomes more important. A DT prediction could, for example, predict that a spike in user activity might necessitate higher data rates or that specific user interactions may require ultra-low latency to maintain immersion. By correlating predicted user behavior(s) with RAN resource utilization, a DT may facilitate proactively signaling, to a RAN node, a request for resource allocation or reallocation based on the predicted user behavior(s). Thus, for example, network resources may be provisioned based on predicted user activity to facilitate a seamless and immersive XR experience for the user.

Optimizing Resource Utilization.

A DT may not just enhance a user's experience but may also contribute to optimizing scheduling of network resources. By forecasting user behavior and corresponding RAN resource requirements, wasteful over-provisioning or detrimental under-provisioning, by a RAN node, may be minimized. Thus, not only may valuable network resources be conserved but the XR environment may be responsive and adaptive to the user's needs and expectations.

According to embodiments disclosed herein, adaptive predictive signaling of feedback indicative of short-term XR user/human behavior or actions may facilitate RAN nodes becoming aware of predicted user actions and behavior and accordingly optimizing radio operation with respect to the predicted XR user behavior. Artificial intelligence/machine learning ("AI/ML") prediction capability with respect to XR user behavior may be configured, or programmed into, an XR appliance or an XR processing unit, which may support communication between an XR appliance and a serving RAN node. In an embodiment, an AI learning model that may facilitate predicting XR user behavior may be facilitated by a DT, which may emulate and efficiently predict short-term XR human user actions.

According to embodiments disclosed herein, a RAN node may determine possible XR device user behavior/action characteristics (e.g., pose degree, orientation, mobility, eye flip rate. or respective viewing areas) that may be fed back from third-party XR platforms/servers that may be part of, or communicatively coupled with, core network equipment. The RAN node may compile, or receive from core network equipment, a list of standard, or common, actions and value ranges corresponding to the actions to be predicted by the prediction capability at the XR device. During establishment of an XR session, the RAN node may configure the XR device, which may be capable of predicting one or more supported user behavior metrics, with a list of user behavior characteristic(s) and associated value range(s). The XR device may be further configured with a minimum confidence level, or criterion, corresponding to actions to be predicted, that may be used, if the criterion is satisfied, to trigger reporting future/predicted user behavior metrics, corresponding to user characteristics corresponding to which the XR device is cable of determining and reporting, towards the RAN node. The confidence level criterion may facilitate avoiding reporting determined user characteristic values if the determined values cannot be determined with a confidence level at least as rigorous as the confidence level criterion. Accordingly, an XR device, upon determining a user characteristic value with a confidence level that satisfies the confidence level criterion, may report back a respective user action user characteristic value as a prediction, or predicted value, and a respective validity period indication that is indicative of a validity period during which the predicted user behavior metric may be valid (e.g., the confidence level that satisfied the confidence level criterion may only be valid with respect to the respective user characteristic prediction during the validity period). Thus, the RAN node may be made aware of potential future short-term to mid-term XR user behavior/actions and may accordingly fine tune resource scheduling and energy consumption strategies to accommodate traffic that may correspond to the predicted potential user behavior. As an example, upon becoming aware (based on a confidence level) that a pose direction corresponding to an XR appliance may not change during a next determined period (e.g., a validity period during which confidence level is applicable to a corresponding reported user characteristic value), the RAN node may temporarily shut down uplink control resources which might otherwise be used to carry potential pose information updates from the XR device, thus increasing network energy saving gains due to the temporary receiver shutdown.

Current techniques may facilitate stringent XR services with a focus on a RAN node obtaining information, knowledge, or awareness of XR traffic or XR application behavior. For example, conventional techniques support signaling procedures that facilitate XR devices providing to a RAN node expected traffic profiles, expected traffic arrival rate(s), expected packet size(s), and other application-dependent performance indicators. However, conventional techniques do not consider XR user/human actions or behavior. Accordingly, embodiments disclosed herein facilitate tracking predicted XR user/human behavior with dynamic XR user action characteristic reporting adapted to a given XR application.

Furthermore, conventional techniques focus on reporting radio function/performance metrics application functions/performance metrics. However, according to embodiments disclosed herein, reporting from an XR appliance or XR processing unit may carry XR user/human behavior action characteristic, such as human eye flip rate, that are of different nature than conventional radio performance indicators.

Proactive Signaling of XR User Behavior.

Figure 3:
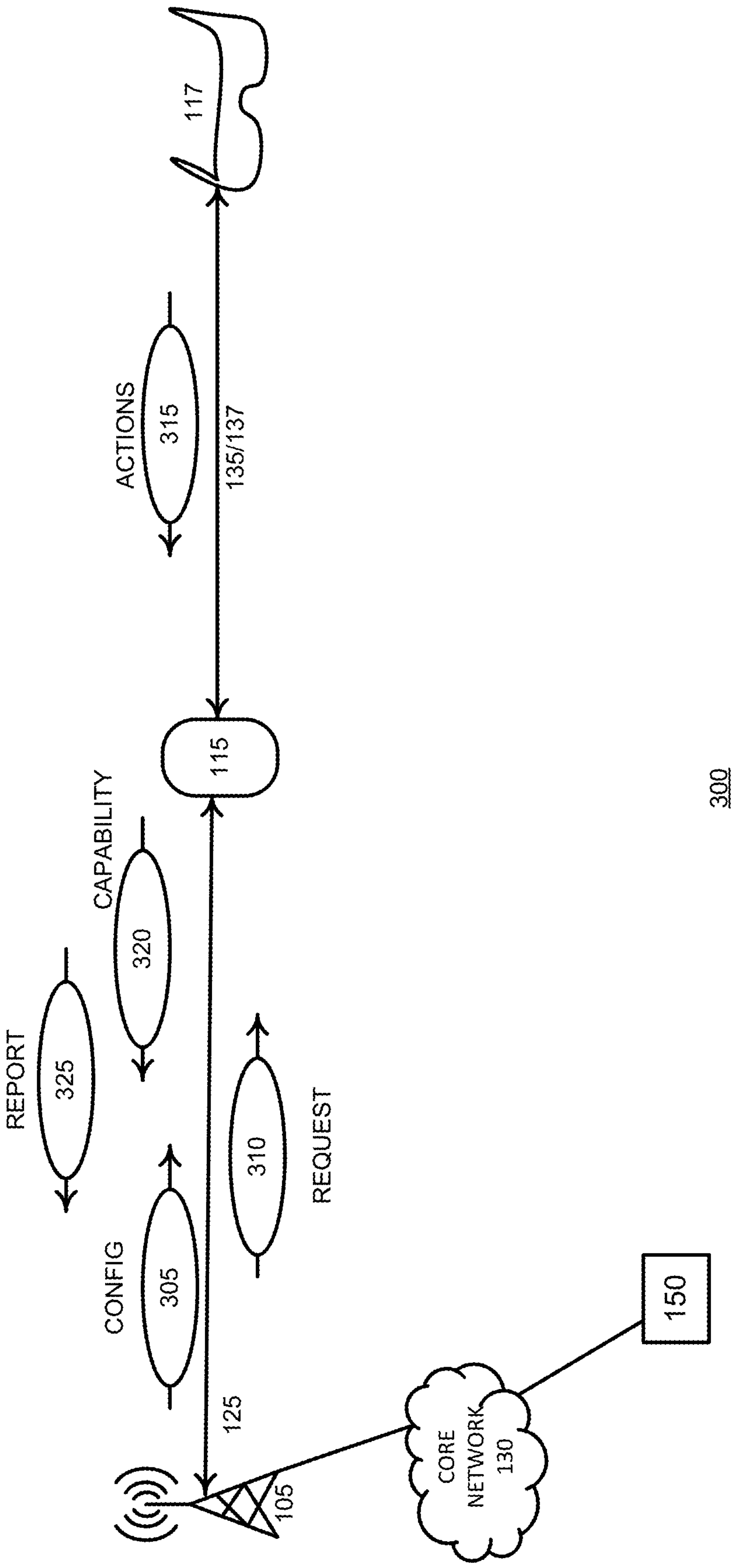
FIG. 3 illustrates an example environment with an anything reality appliance tethered to a user equipment managing related traffic flows with the appliance.

Turning now to FIG. 3, the figure illustrates an example environment 300 with an extended reality appliance 117 tethered to a user equipment 115. Appliance 117 may be referred to as an end XR appliance in reference to the relationship of being at an end of a communication session, with respect to RAN node 105, with extended reality appliance 115 being located intermediate to the RAN node and the appliance. XR processing unit 115 may be more capable with respect to battery capacity (or may be supplied power via a wired power supply receiving power from an electrical wall outlet) or processing capability than XR appliance 117. End XR appliance 117 may transmit XR user behavior characteristic metric updates (e.g., user action information corresponding to one or more behavior characteristics) toward the middle processing unit 115 that may track the characteristic update information and, based on the user characteristic update information, may predict future user behavior action(s) corresponding to use of the XR appliance. Accordingly, upon satisfying a configured minimum prediction confidence level corresponding to one or more user behavior characteristics, the XR processing unit may use a DT and associated AI capability to generate a user characteristic report indicative of predicted user behavior and transmit to the serving RAN node the report as part of an uplink control information ("UCI") signaling message. The XR user characteristic behavior report may comprise one or more index/indices or indication(s) corresponding to each of one or more XR behavior actions, associated with one or more respective predicted action value(s), level(s), or value (s) and one or more respective expected validity period applicable to respective predictions. Upon receiving a user characteristic report, the serving RAN node may optimize energy saving and scheduling measures based on information corresponding to expected XR user behavior or actions indicated in the report.

In an example embodiment shown in FIG. 3, RAN node 105 may receive a list of possible XR user actions, or behavior metrics, or characteristics, that may be used to facilitate an XR session with appliance 117 by an XR end platform or server 150, most likely placed at a network edge, communicatively coupled with core network equipment that may be part of core network 130. Examples of XR user behavior that may be supported by XR server 150 may comprise an XR device pose position in terms of degrees, appliance orientation in terms of degrees, user mobility, user hand orientation information, XR user eye flip rate, or orientation of the XR appliance in space. RAN Node 105 may transmit the list of possible XRP user actions to XR processing unit 115 via a user characteristic reporting configuration 305. XR processing unit 115 may announce, or provide, a capability with respect to processing capability for predicting the XR user behavior, via user characteristic capability message 320, during connection establishment with RAN node 105. RAN node 105 may configure XR processing unit 115 with a list of XR user behavior characteristics to be predicted via a user characteristic reporting request message 310 that may comprise one or more user characteristic indications corresponding to user characteristics, indicated in capability message 320, that the XR processing unit is capable of predicting, which may be a subset of user characteristics listed in configuration 305. Configuration 305 may comprise quantized indications, which may be referred to as user characteristic indications, corresponding to user characteristics. Thus, a user characteristic indication may comprise one, two, or a few bits to indicate user characteristics in message 310 or 320. User characteristic reporting request message 310 may be referred to as a request insofar as message 310 indicates to XR processing unit 115 user characteristics to predict and report to RAN node 105 and message 310 indicates time relative to when indicated user characteristics are to be reported.

RAN node 105 may configure, indicate, or request via user characteristic reporting request message 310, predicting and reporting, by XR processing unit 115, of at least one of the at least one user characteristic(s) indicated in configuration 305. Characteristic reporting request 310 may comprise a minimum prediction confidence level, or value, associated with an indicated user characteristic. Characteristic reporting request 310 may comprise a prediction validity period during which the confidence level should be valid with respect to user characteristic predictions made by XR processing unit 115. A minimum prediction confidence level may be usable by XR processing unit 115 to trigger sending predicted XR user behavior characteristic values corresponding to the confidence level towards RAN node 105 via a user characteristic report 325. For example, if XR processing unit 115 determines that a prediction of a user characteristic cannot be made with a confidence level that satisfies a minimum confidence level configured via request 310 for a configured validity period specified in request 310, the XR processing unit may avoid reporting a user action indication, in a report 325, indicative of a user action corresponding to a user characteristic indicated by user characteristic reporting request 310. A confidence level threshold may be specified such that all XR devices calculate an XR prediction in a consistent and pre-determined manner, or a confidence level may be specified such that RAN node 105 specifies a minimum confidence level to be applied to determining or reporting predicted XR user behavior metrics. XR processing unit 115, using AI/ML or DT prediction capability, may track XR user behavior actions 315 received from XR user appliance 117, and accordingly, may predict, for all of, or part of, XR user behavior characteristic metrics, configured, or requested, via request 310, corresponding to user characteristic(s) configured by request 310. Upon a minimum configured prediction confidence level corresponding to a prediction of an XR user action configured, or requested, for prediction via request 310, being satisfied, XR processing unit 115 may compile an XR user behavior report 325 that may comprise predicted values, or information, corresponding to XR user behavior actions indicated in request 310 that are valid during associated respective prediction validity period(s) indicated in request 310. In an embodiment, an XR user behavior report 325 may comprise one or more predicted validity period(s) associated with one or more predicted values, or information, corresponding to XR user behavior characteristics indicated in request 310, that are shorter or longer than respective prediction validity period(s) indicated in request 310.

Turning now to FIG. 4, the figure illustrates an example user characteristic reporting configuration 305. An extended reality processing unit may receive configuration 305 comprising a list of potential XR user behavior characteristics to be predicted by an XR processing unit, such as XR processing unit 115 described in reference to FIG. 3. A serving RAN node, such as node 105 described in reference to FIG. 3, may receive a list of all XR user characteristics, supported by, or usable by, an XR server, for purposes of potential tracking and prediction, from the core network equipment, including an edge XR server, wherein each XR user characteristic, or behavior, 410 is associated with a user characteristic indication 405 in configuration 305 that is transmitted from the serving RAN node to an XR processing unit. An action or behavior 410 may be referred to as a user characteristic and an indication 405 may be referred to as a user characteristic indication. Examples of user characteristics 410 may comprise tracking of a pose position of an XR appliance being used by a user; XR appliance orientation tracking, user hand(s) motion(s), or user eye flips.

Accordingly, during establishment of an XR session connection, a serving RAN node may configure an XR processing unit with information in configuration 305 as part of a downlink control information ("DCI") signaling message. As described in reference to FIG. 3, configuration information 305 may be processed by, or interpreted by, XR processing unit 115 as a request to provide prediction capability with respect to capability to predict user actions corresponding to characteristics 410 that may be performed by a user of an XR appliance during the XR session between the XR appliance and serving RAN that is facilitated by the XR processing unit.

Figure 5:
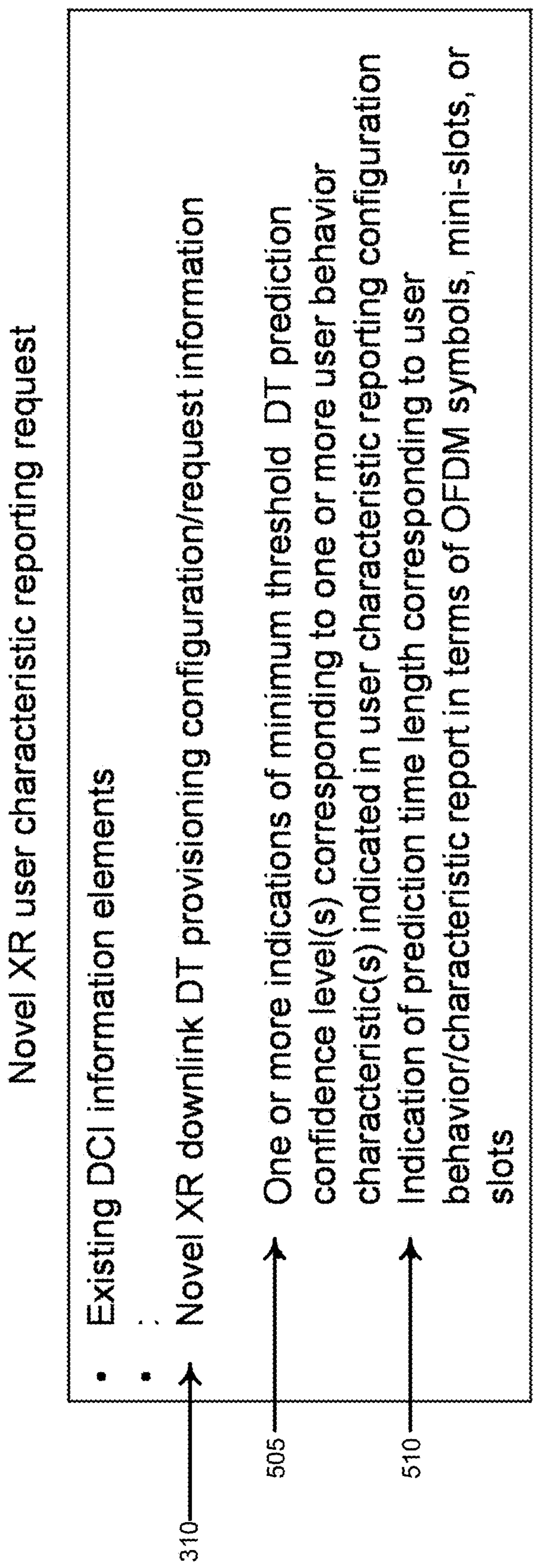
FIG. 5 illustrates an example user characteristic reporting request.

Turning now to FIG. 5, the figure illustrates an example user characteristic reporting request 310 transmitted in a DCI message 500. User characteristic reporting request information 310 may comprise in field 505 a user characteristic confidence level criterion, which may be a minimum threshold, usable by an XR processing unit to trigger compiling and transmitting, towards a serving RAN node, predicted XR user characteristics in a user characteristic report 325 (described in reference to FIG. 3). A user characteristic confidence level criterion indicated in field 505 of request information 310 may be associated, in information 310, with a user characteristic indication (e.g., an indication contained in a field 405 shown in FIG. 4). User characteristic reporting request information 310 may comprise an allowable maximum time length/validity period indication in field 410 indicative of a period during which an XR processing unit should be able to confidently predict a predicted XR user behavior characteristic value (e.g., a prediction of future user characteristic behavior satisfies a user characteristic confidence level criterion, indicated in field 505, that corresponds to the validity period.

A user characteristic confidence level criterion indicated in field 505 may facilitate a minimum prediction accuracy corresponding to prediction of a certain user behavior characteristic being satisfied before reporting of predicted value (s) corresponding to the user characteristic toward a serving RAN node, thus facilitating minimizing 'misleading' of the RAN node with poorly-predicted XR user behavior characteristic values. Thus, an XR processing unit may avoid transmitting a user characteristic report containing a predicted user characteristic until a user characteristic to be reported via a user characteristic report can be predicted with a confidence level that satisfies a criterion specified in field 505. A validity period indicated in field 510 may be a period during which an XR processing unit determines that a confidence level associated with a predicted user characteristic value can be sustained or will likely be applicable.

Turning now to FIG. 6, the figure illustrates an example user characteristic report 325. Report 325 may comprise one or more XR appliance identifiers 605A-605*n* corresponding to one or more end XR appliances, for example end XR appliance 117 shown in FIG. 3. For a given XR appliance identifier 605A, 605B . . . or 605*n*, one or more user characteristic indications may be indicated in fields 610A, 610B . . . or 610*n*. It will be appreciated that a user characteristic indication indicated in one or more field(s) 610 may be user character indication(s) indicated in configuration 305 or requested in request message information 310. One or more user characteristic indications may be indicated in a single field 610. For example, for an XR appliance $y_2$ indicated in field 605B one or more user characteristic indications may be indicated in corresponding field 610B. For each one or more user characteristic indication indicated in a field 610 one or more corresponding predicted user characteristic value(s) may be indicated in respective field 615. For each one or more predicted user characteristic value(s) indicated in a field 615 one or more corresponding validity period(s) may be indicated in corresponding field 620. For example, for end XR appliance $y_2$ indicated in field 605A, field 610A may comprise user characteristic indications (0) corresponding to a position of a pose portion of the end XR appliance and an appliance orientation indication (1) corresponding to an orientation of the end XR appliance $y_2$. In the example, field 615A may comprise a value in terms of degrees indicative of the pose portion position of the XR appliance indicated in field 605A, and field 615A may also comprise a value in terms of degrees indicative of and orientation of the XR appliance indicated in field 605A period. Field 620A may comprise a first validity period corresponding to the pose position value indicated in field 615A and a second validity period corresponding to the appliance orientation value indicated in field 615A. Validity periods indicated in one or more fields 620 may be the same as, or may be different than, a validity period indicated in request message 310 corresponding to the one or more user characteristic indications indicated in field 610A. Thus, configuration 310 may comprise a validity period during which an XR processing unit should have confidence, at least as good as a confidence value indicated in configuration information 310, that a predicted value corresponding to a user characteristic indicated in configuration 310 is valid. However, an XR processing unit that is reporting a predicted user characteristic value in field 615 of report 325 may determine a different validity period, for example a shorter validity period, than a validity period indicated in request 310, based on processing capability of the processing unit. In an embodiment, a validity period indicated in report 325 may be based on a quality of service corresponding to resources configured by a serving RAN to facilitate delivery of traffic corresponding to user actions, associated with a given user characteristic indicated in report 325, that are performed by a user after predicted values indicated in field 615 of report 325 are generated. For example, a validity period may correspond to reduced, relaxed, or easier processing by an XR processing unit if the XR processing unit does not have to guarantee a prediction of a user characteristic value in a report 325 with a given confidence level to be valid for as long as if the validity period were longer. Thus, a DT, or machine learning model, corresponding to the XR processing unit may require less processing to make a prediction that satisfies a confidence level for a short period than if the DT, or machine learning model, makes a prediction that must satisfy a confidence level for a longer period.

Figure 7:
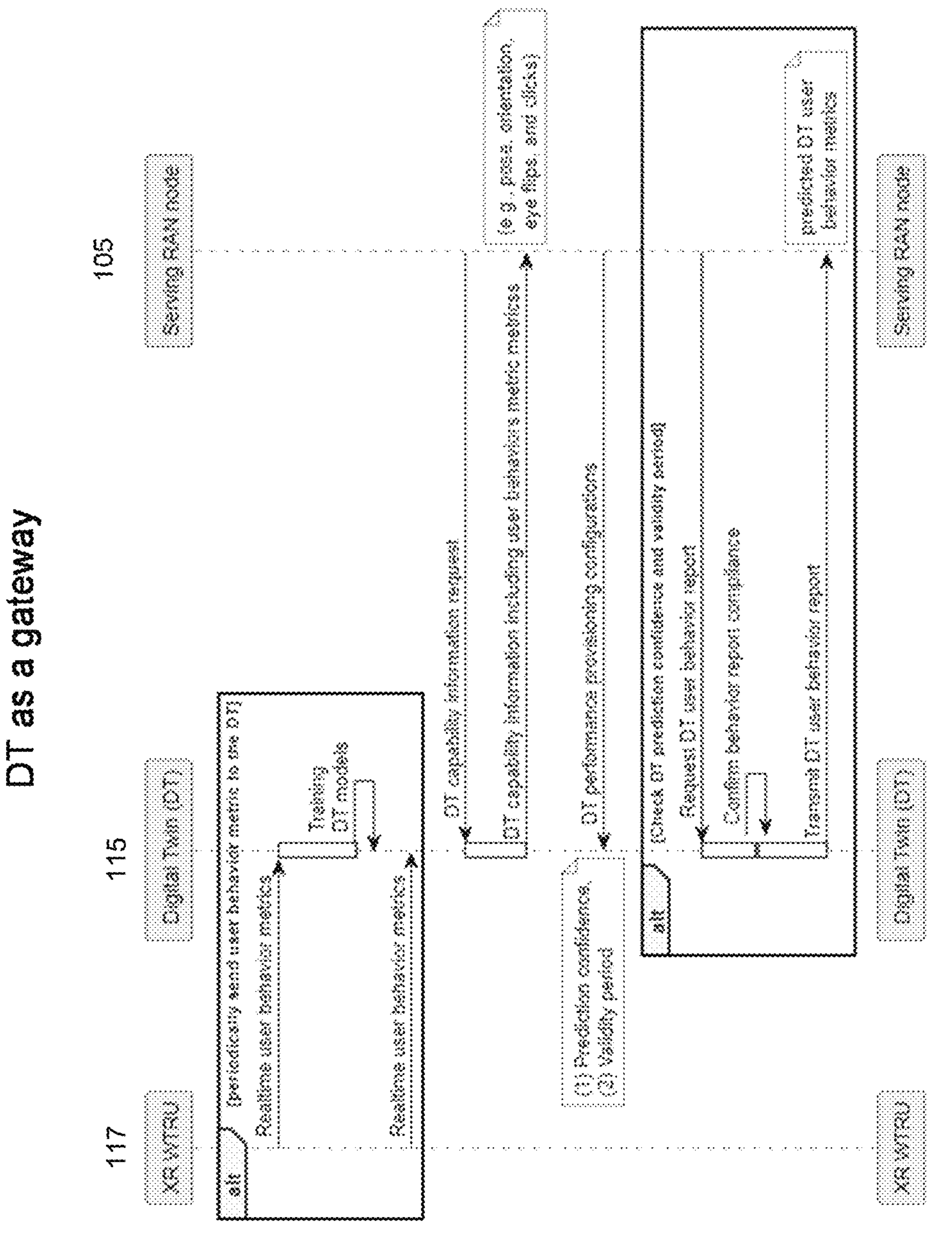
FIG. 7 illustrates an example embodiment of directing to an extended reality processing unit a user characteristic capability indication.

Turning now to FIG. 7, the figure illustrates an example embodiment of directing to an extended reality processing unit a user characteristic capability indication. FIG. 7 illustrates a communication flow between three entities: XR appliance 117, a DT executing at XR processing unit 115, and serving RAN node 105. Initially, RAN node 105 requests DT prediction capability information from XR appliance 117, which may forward the request to the DT. The DT responds to XR appliance 117 with capability information and the appliance relays a list of supported XR user behavior characteristics (e.g., pose, orientation, eye flips, clicks, etc.) to RAN 105. In response, RAN node 105 may provide XR processing unit 115 with DT performance provisioning configuration information, such as may be contained in request 310 described in reference to FIG. 3, comprising confidence and validity period information. In an alternative flow embodiment, XR processing unit 115 may check the DT's prediction confidence and validity period by requesting a DT user behavior report. Upon confirmation of report compliance from the DT, XR processing unit 115 may transmit a user behavior characteristic report, such as report 325 described in reference to FIG. 3, to RAN node 105.

Figure 8:
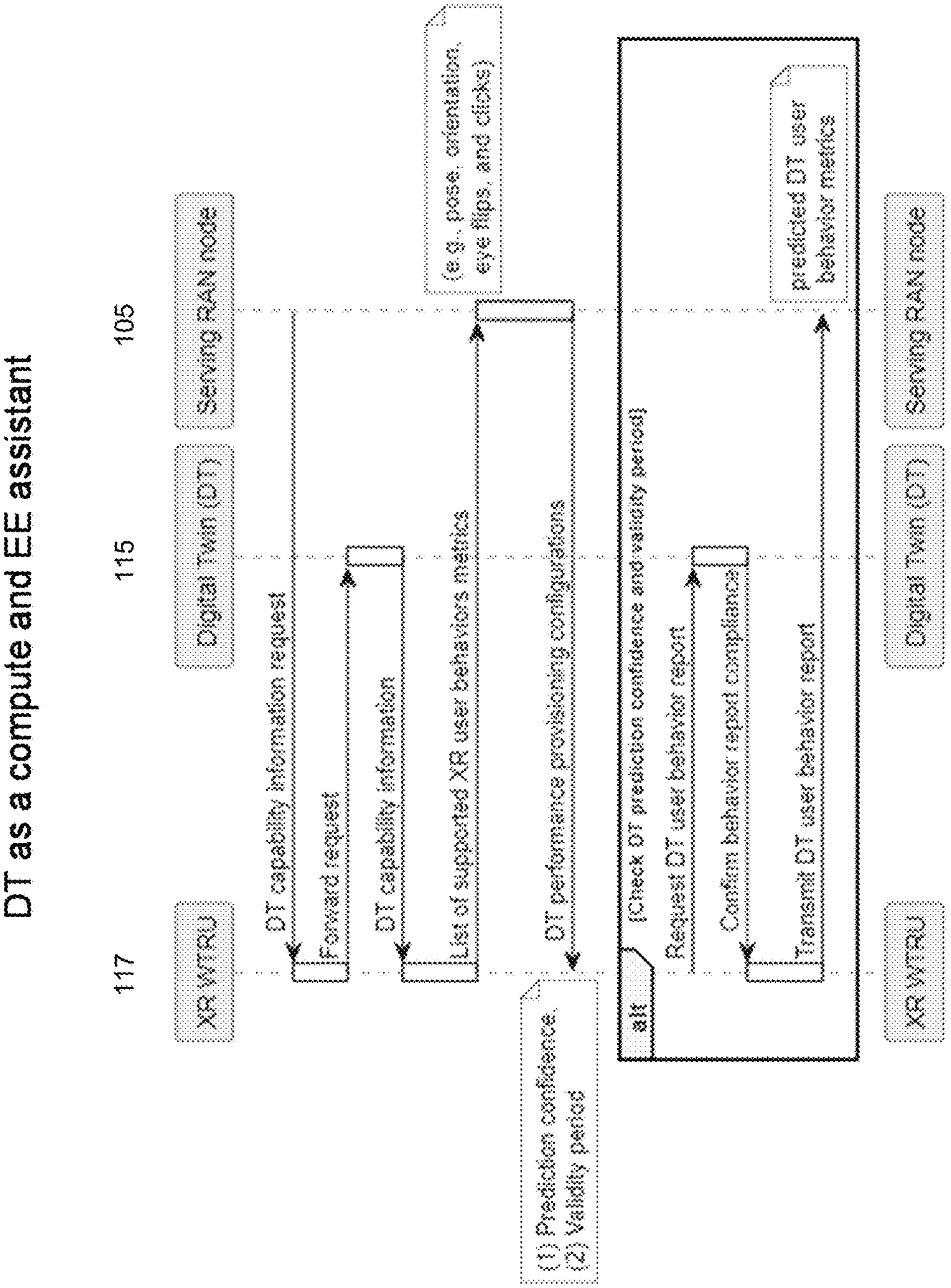
FIG. 8 illustrates an example embodiment of directing to radio access network node a user characteristic capability indication.

Turning now to FIG. 8, the figure illustrates an example embodiment of directing to radio access network node 105 a user characteristic capability indication. The embodiment illustrated in FIG. 8 may be useful in a situation wherein an XR processing unit facilitates user characteristic prediction by a DT, or other learning model, but is not equipped with long-range radio functionality capable of facilitating communication with a serving RAN node. XR processing unit 115 may continuously relay real-time user behavior characteristic metrics received from XR appliance 117 to a DT. The DT may process the metrics to fine-tune corresponding learning models. Serving RAN node 105 may request information corresponding to capability of the DT to predict user behavior characteristics. The DT may provide user behavior characteristic metric values corresponding to characteristics such pose alignment, appliance orientation, eye flips, or clicks. Thereafter, RAN node 105 may determine, and facilitate transmission toward the DT of a request information message 310 comprising indications of prediction confidence level(s) or validity period(s) corresponding to one or indicated user characteristics.

Figure 9:
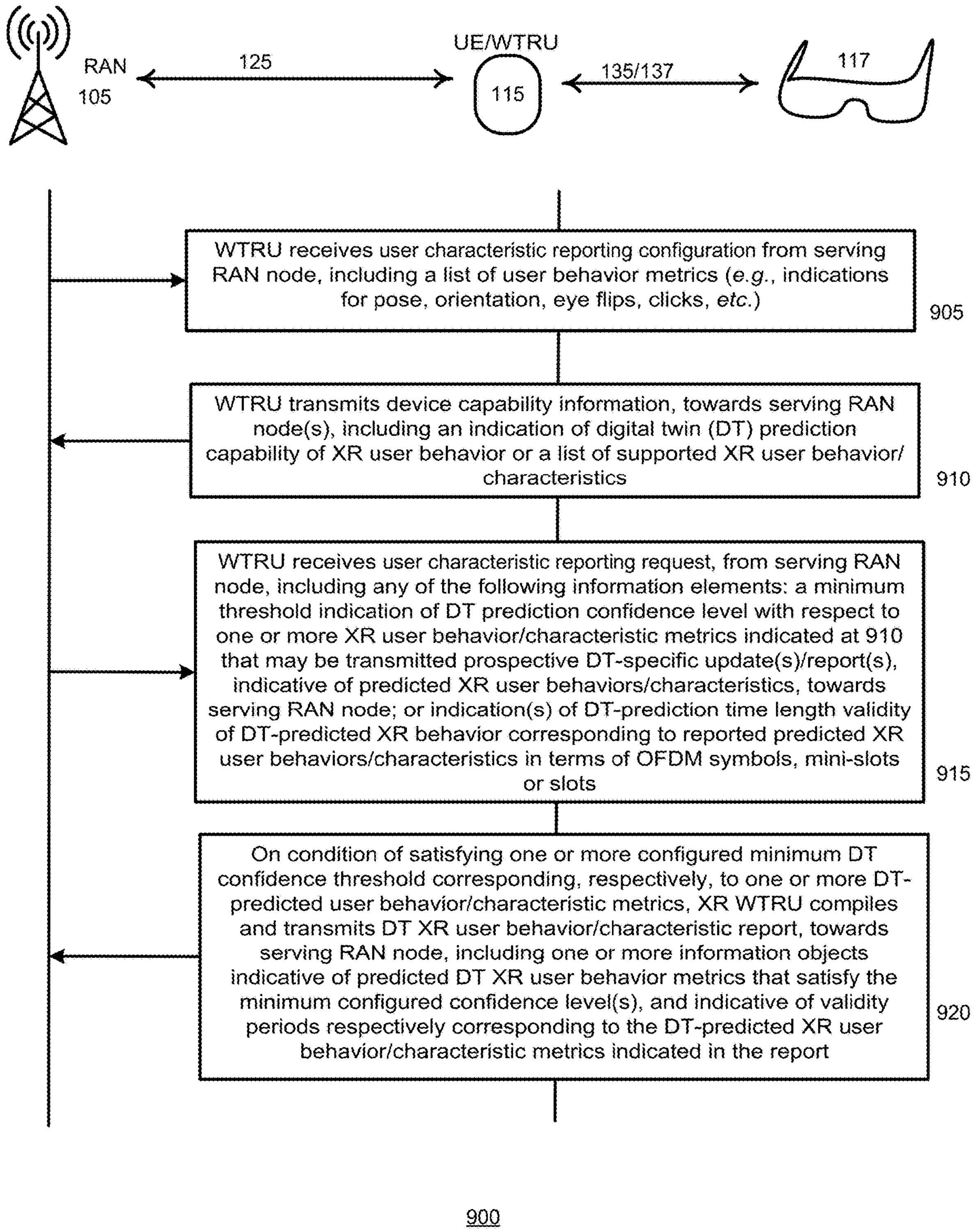
FIG. 9 illustrates timing diagram of an example embodiment of providing a user characteristic report to a radio access network node.

Turning now to FIG. 9, the figure illustrates a timing diagram of an example embodiment method 900 to provide a user characteristic report to RAN node 105. At act 905, XR processing unit 115 may receive an XR digital twin capability information request from serving RAN node 105. The capability request may be referred to as a user characteristic reporting configuration, and may comprise a list of user behavior characteristics corresponding to use of end XR appliance 117 (e.g., characteristics may be one or more of appliance pose orientation, appliance orientation, eye flips, clicks, and the like). At act 910, XR processing unit XR processing unit may transmit to RAN node 105 device capability information indicative of capability to predict actions by a user of appliance 117. The device capability information may comprise an indication of a digital twin capability to predict user action(s) by a user while using XR appliance 117. The capability information may comprise a list of XR user behavior characteristics with respect to which the processing unit 115, or a DT being executed thereby, can predict future user action(s). At act 915, XR processing unit 115 may receive, from serving RAN node 105, a performance provisioning configuration, which may be referred to as a user characteristic reporting request. The user characteristic reporting request may include a minimum threshold indication indicative of a prediction confidence level with respect to one or more user behavior characteristic indicated in the capability information transmitted at act 910, which confidence level may be used as a criterion, or trigger, for determining or transmitting prospective, predicted user characteristic value towards serving RAN node 105. The user characteristic reporting request may include an indication of a DT prediction validity period/time length corresponding to a predicted user characteristic value, transmitted to the RAN node, in terms of OFDM symbols, mini-slots or slots. At act 920, on condition of satisfying a configured minimum confidence threshold, received in the request at act 915, with respect to one or more user characteristic values predicted by a DT/learning model, XR processing unit 115 may compile and transmit, towards serving RAN node 105, an XR user behavior report, which may be referred to as a user characteristic report. A user characteristic report may comprise one or more information objects containing, or indicative of, one or more user characteristic values predicted by a DT, or other learning model type, that satisfy one or more minimum confidence level(s) included in the request received at act 915. A user characteristic report may comprise one or more validity periods corresponding to the user behavior characteristic values, or metrics, predicted by a DT, or other learning model, being executed by XR processing unit 115. RAN node 105 may use information contained in the user characteristic report to allocate, schedule, reschedule, suspend, adjust, modify, or otherwise change resources configured for use to deliver XR traffic between the RAN node and XR processing unit 115 (or XR appliance 117).

Figure 10:
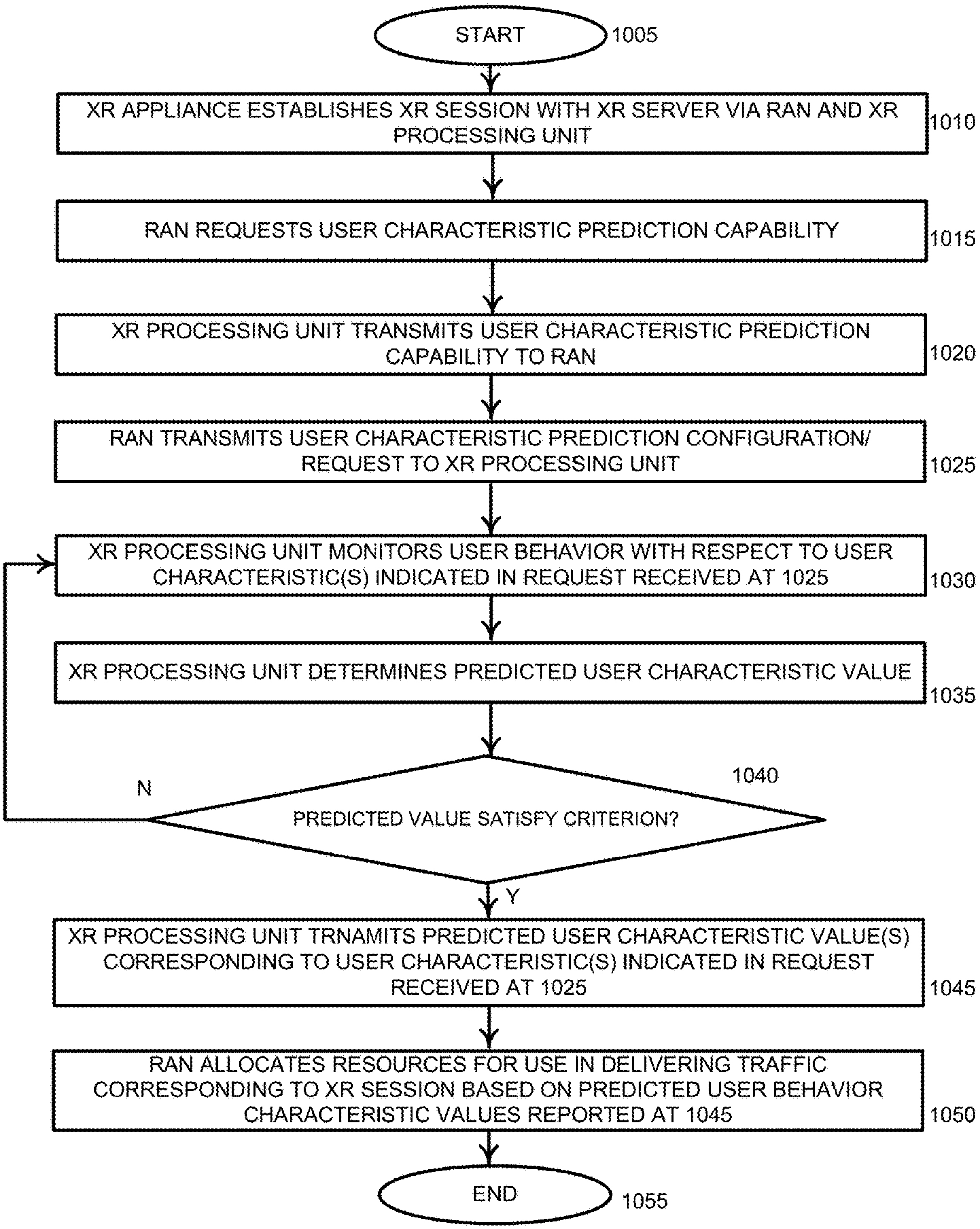
FIG. 10 illustrates a flow diagram of an example embodiment method of providing to a radio access network node a user characteristic report usable to schedule radio resources.

Turning now to FIG. 10, the figure illustrates a flow diagram of an example embodiment 1000. Method 1000 begins at act 1005. At act 1010, an XR appliance may establish an XR session with an XR server via a radio access network node. An XR processing unit proximate the XR appliance and communicatively coupled thereto by a short-range wireless link such as a Wi-Fi link or a sidelink link, may facilitate delivery of traffic between the radio access network node and the XR appliance. At act 1015, the radio access network node may request user characteristic prediction capability with respect to capability to predict user action behavior characteristics corresponding to use of the XR appliance. In an embodiment, the prediction capability may correspond to a direct twin, or other machine learning model, being executed by the XR processing unit. In another embodiment, the prediction capability may correspond to a direct twin, or other machine learning model, being executed by the XR appliance, however an XR processing unit typically will have superior processing capability with respect to the XR appliance. The request for user characteristic prediction capability may be made via a user characteristic reporting configuration, such as configuration 310 described in reference to FIG. 3.

At act 1020, the XR processing unit (or the XR appliance) may transmit to the radio access network node a capability indication indicative of a capability to predict user action behavior characteristics. A capability to predict user action behavior characteristics may depend on processing power or battery power. At act 1025, the radio access network node may transmit a user characteristic prediction configuration/request, comprising information such as information 310 described in reference to FIG. 3 and FIG. 5. The request received at act 1025 may comprise an indication of one or more user characteristics and an indication of one or more confidence level values respectively corresponding to the one or more user characteristics. The request received at 1025 may comprise a validity period, or a validity period indication, during which one or more confidence levels, respectively corresponding to one or more user behavior characteristic predictions associated with one or more user characteristics, is to be valid.

At act 1030, the XR processing unit (or XR appliance) may monitor actual user behavior caused by a user of the XR appliance. For example, the XR processing unit may analyze traffic delivered between the XR appliance and the radio access network node to determine actual user behavior. Based on the actual user behavior determined at act 1030, at act 1035 the XR processing unit (or XR appliance) may predict future user activity corresponding to characteristics indicated in the request received at act 1025 and may indicate the predicted future user activity with one or more predicted user characteristic values, or indications of predicted user characteristic values. At act 1040, the XR processing unit (or XR appliance) may make a determination whether a determined predicted user characteristic value determined at act 1035 satisfies a criterion indicated in the request received by the XR processing unit (or XR appliance) at act 1025. If a determined predicted user characteristic value determined at act 1035 is determined at act 1040 not to satisfy a corresponding criterion indicated in the request received act 1025, method 1000 returns to act 1035. For example, if a predicted user characteristic value determined at act 1035 cannot be predicted by the XR processing unit (or XR appliance) with a confidence level that satisfies a confidence level indicated in the request received at act 1025, the XR processing unit (or XR appliance) may continue monitoring user behavior at act 1030 and determining predicted user characteristic values at act 1035.

If a determination is made at act 1040 that a criterion, for example a confidence level corresponding to a determined predicted user characteristic value satisfies a confidence level criterion indicated in the request received at act 1025, method 1000 may advance to act 1045. At act 1045, the XR processing unit (or XR appliance) may transmit predicted user characteristic values corresponding to user characteristics indicated in the request received at act 1025 as a user characteristic report to the radio access network node. At act 1050, the radio access network node may allocate resources for use in delivering traffic corresponding to the XR session established at act 1010 based on predicted user behavior characteristic values reported and the user characteristic report at act 1045. Method 1000 advances to act 1055 and ends.

Turning now to FIG. 16, the figure illustrates examples of information 1600 corresponding to use of an end XR appliance that may be usable by a DT, or other learning model, to predict user behavior characteristic values that may be used by a RAN node to facilitate determining scheduling of resources usable for delivery of traffic with respect to use of the XR appliance. Information 1600 may comprise user behavior characteristics that may be indicated in fields 410A, 410B, . . . 410*n* shown in FIG. 4.

Figure 11:
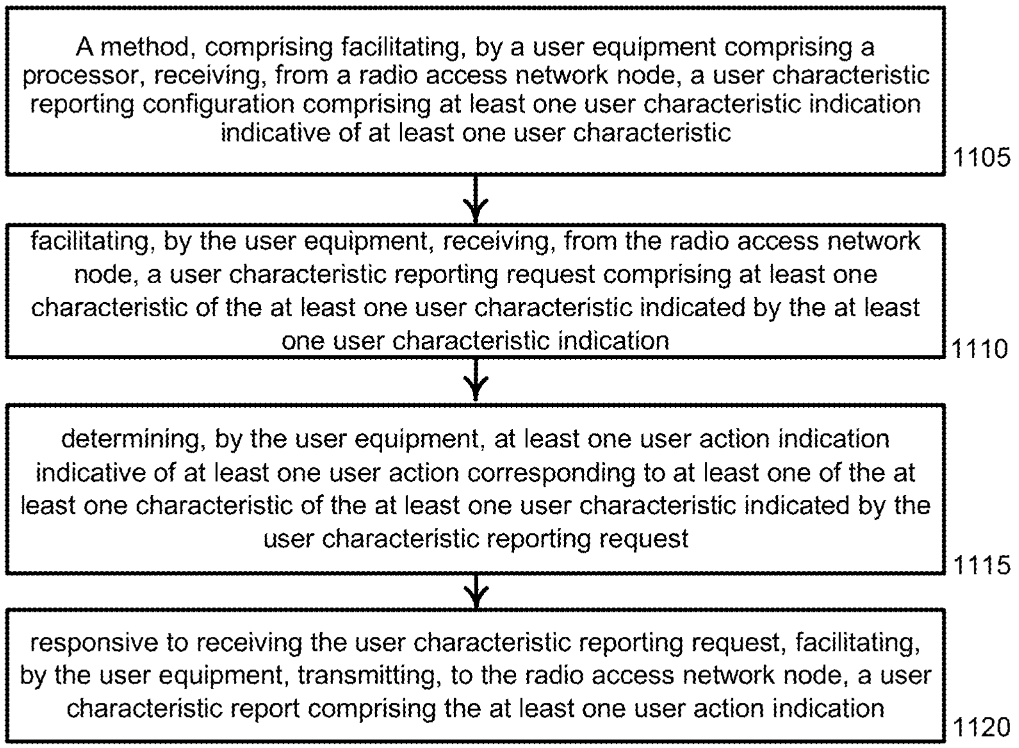
FIG. 11 illustrates a block diagram of an example method embodiment.

Turning now to FIG. 11, the figure illustrates an example embodiment method 1100 comprising at block 1105 facilitating, by a user equipment comprising a processor, receiving, from a radio access network node, a user characteristic reporting configuration comprising at least one user characteristic indication indicative of at least one user characteristic; at block 1110 facilitating, by the user equipment, receiving, from the radio access network node, a user characteristic reporting request comprising at least one characteristic of the at least one user characteristic indicated by the at least one user characteristic indication; at block 1115 determining, by the user equipment, at least one user action indication indicative of at least one user action corresponding to at least one of the at least one characteristic of the at least one user characteristic indicated by the user characteristic reporting request; and at block 1120 responsive to receiving the user characteristic reporting request, facilitating, by the user equipment, transmitting, to the radio access network node, a user characteristic report comprising the at least one user action indication.

Figure 12:
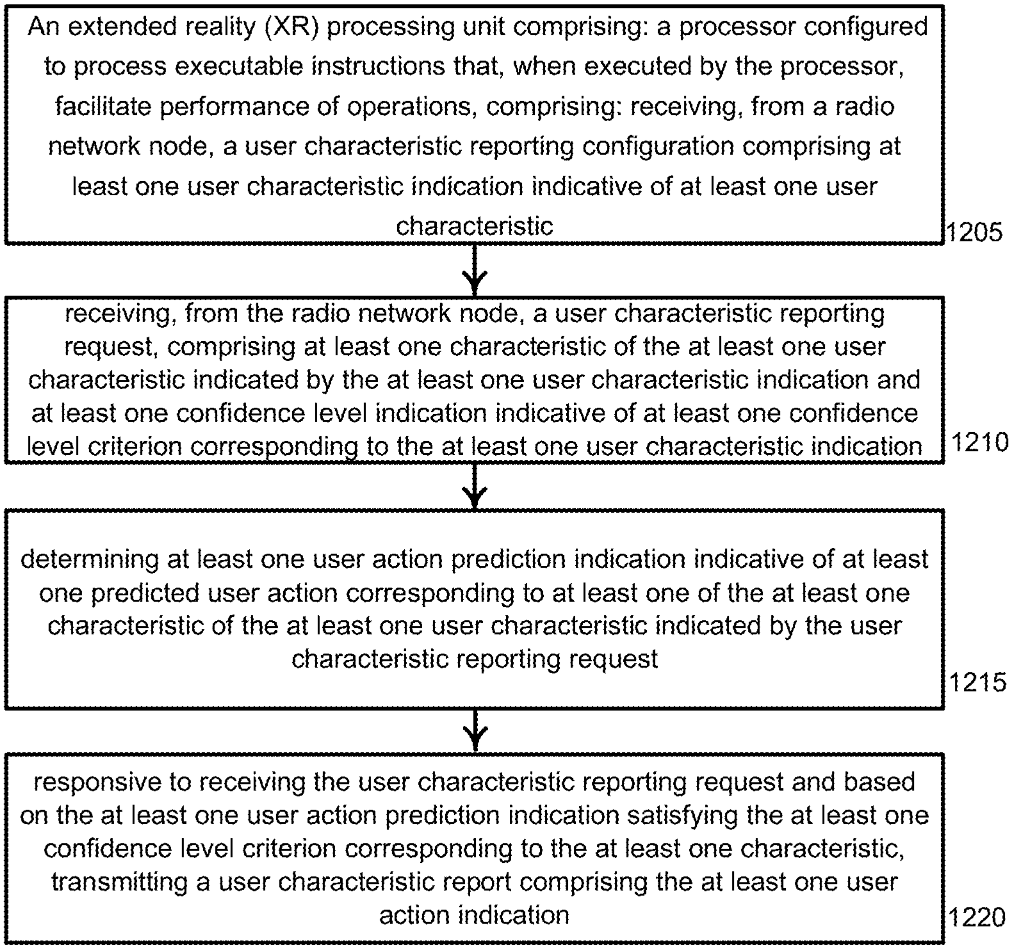
FIG. 12 illustrates a block diagram of an example extended reality processing unit.

Turning now to FIG. 12, the figure illustrates an example extended reality processing unit, comprising at block 1205 a processor configured to process executable instructions that, when executed by the processor, facilitate performance of operations, comprising receiving, from a radio network node, a user characteristic reporting configuration comprising at least one user characteristic indication indicative of at least one user characteristic; at block 1210 receiving, from the radio network node, a user characteristic reporting request, comprising at least one characteristic of the at least one user characteristic indicated by the at least one user characteristic indication and at least one confidence level indication indicative of at least one confidence level criterion corresponding to the at least one user characteristic indication; at block 1215 determining at least one user action prediction indication indicative of at least one predicted user action corresponding to at least one of the at least one characteristic of the at least one user characteristic indicated by the user characteristic reporting request; and at block 1220 responsive to receiving the user characteristic reporting request and based on the at least one user action prediction indication satisfying the at least one confidence level criterion corresponding to the at least one characteristic, transmitting a user characteristic report comprising the at least one user action indication.

Figure 13:
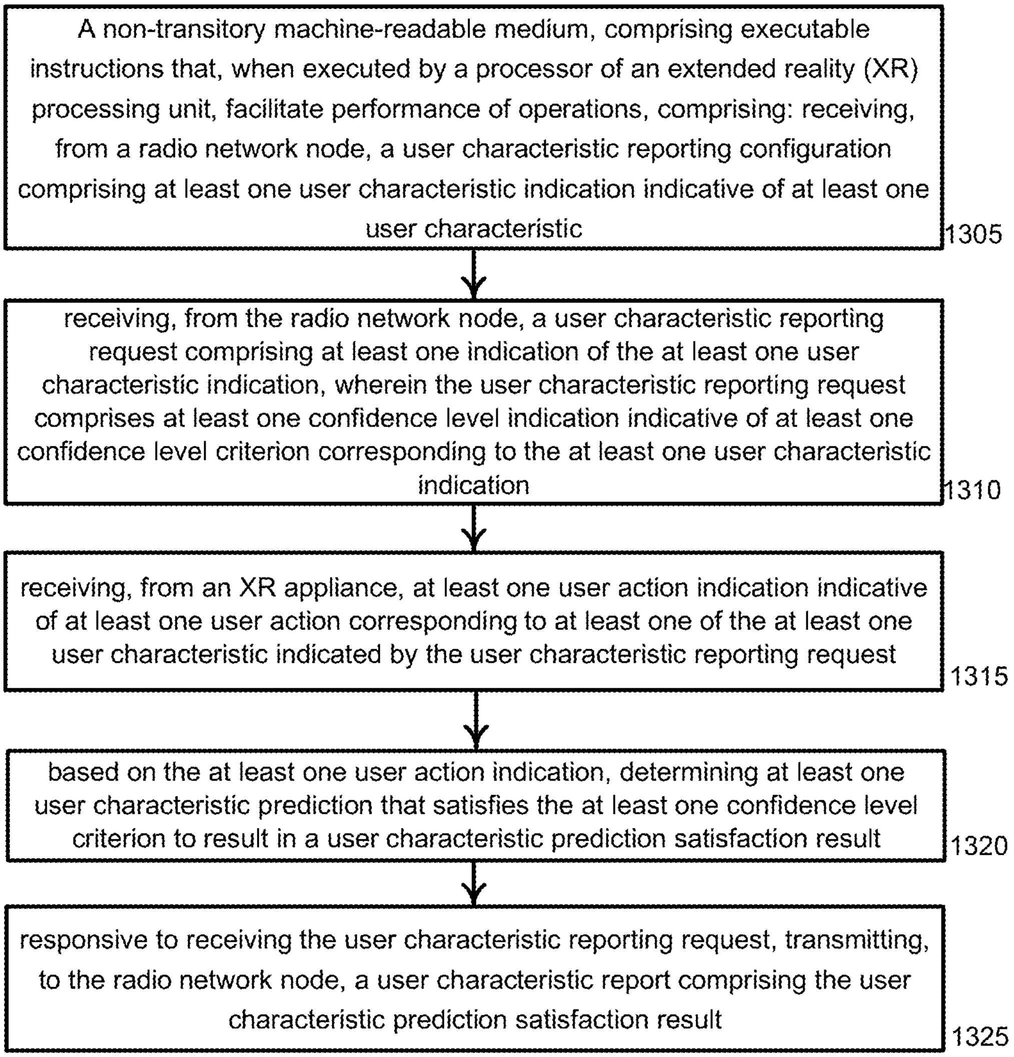
FIG. 13 illustrates a block diagram of an example non-transitory machine-readable medium embodiment.

Turning now to FIG. 13, the figure illustrates a non-transitory machine-readable medium 1300 comprising at block 1305 executable instructions that, when executed by a processor of an extended reality (XR) processing unit, facilitate performance of operations, comprising receiving, from a radio network node, a user characteristic reporting configuration comprising at least one user characteristic indication indicative of at least one user characteristic; at block 1310 receiving, from the radio network node, a user characteristic reporting request comprising at least one indication of the at least one user characteristic indication, wherein the user characteristic reporting request comprises at least one confidence level indication indicative of at least one confidence level criterion corresponding to the at least one user characteristic indication; at block 1315 receiving, from an XR appliance, at least one user action indication indicative of at least one user action corresponding to at least one of the at least one user characteristic indicated by the user characteristic reporting request; at block 1320 based on the at least one user action indication, determining at least one user characteristic prediction that satisfies the at least one confidence level criterion to result in a user characteristic prediction satisfaction result; and at block 1325 responsive to receiving the user characteristic reporting request, transmitting, to the radio network node, a user characteristic report comprising the user characteristic prediction satisfaction result.

Figure 14:
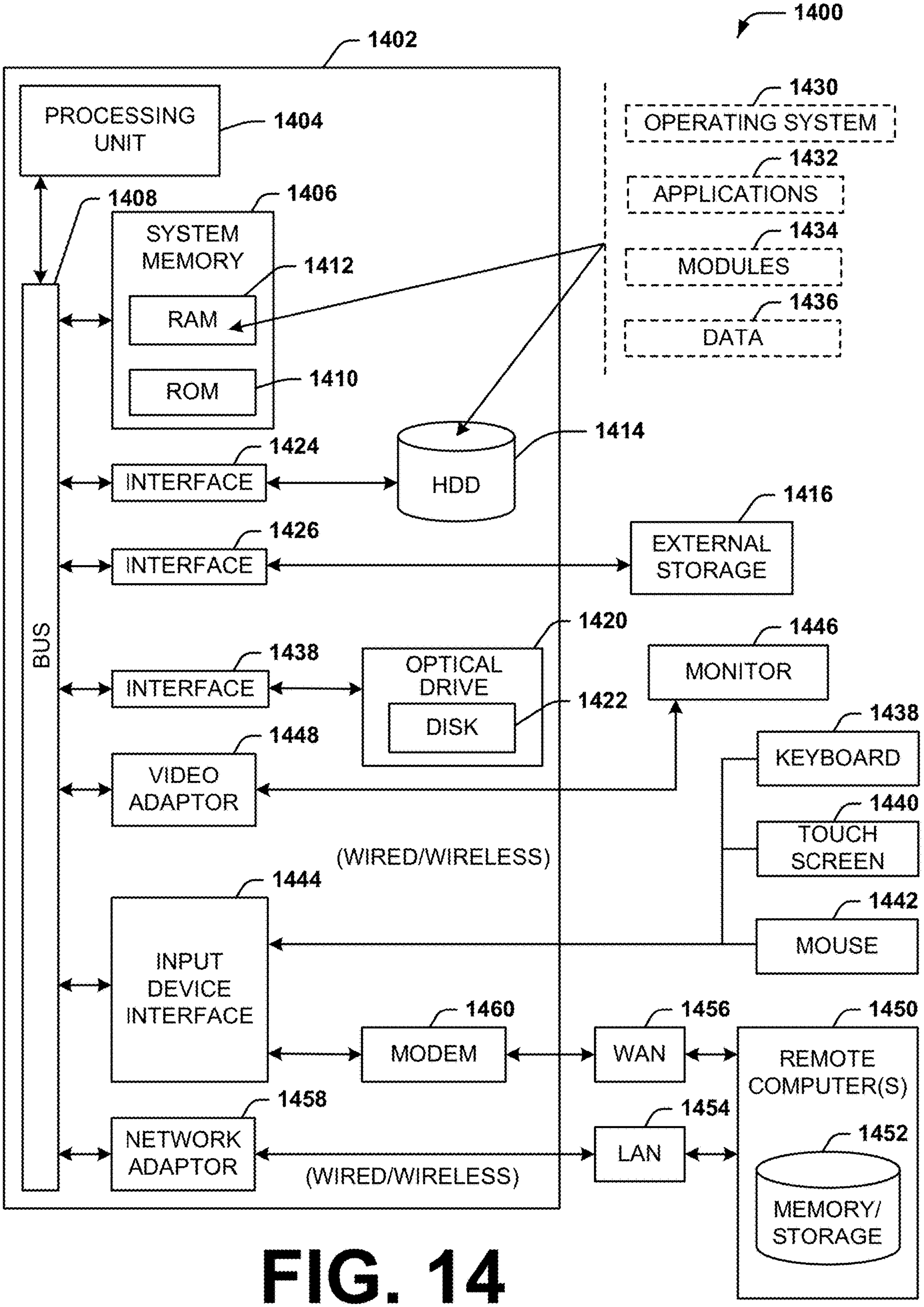
FIG. 14 illustrates an example computer environment.

In order to provide additional context for various embodiments described herein, FIG. 14 and the following discussion are intended to provide a brief, general description of a suitable computing environment 1400 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors and may include a cache memory. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

Computer 1402 further includes an internal hard disk drive (HDD) 1414 (e.g., EIDE, SATA), one or more external storage devices 1416 (e.g., a magnetic floppy disk drive (FDD) 1416, a memory stick or flash drive reader, a memory card reader, etc.) and an optical disk drive 1420 (e.g., which can read or write from a CD-ROM disc, a DVD, a BD, etc.). While the internal HDD 1414 is illustrated as located within the computer 1402, the internal HDD 1414 can also be configured for external use in a suitable chassis (not shown). Additionally, while not shown in environment 1400, a solid-state drive (SSD) could be used in addition to, or in place of, an HDD 1410. The HDD 1414, external storage device(s) 1416 and optical disk drive 1420 can be connected to the system bus 1408 by an HDD interface 1424, an external storage interface 1426 and an optical drive interface 1428, respectively. The interface 1424 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can comprise a security module, such as a trusted processing module (TPM). For instance, with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are examples and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 15:
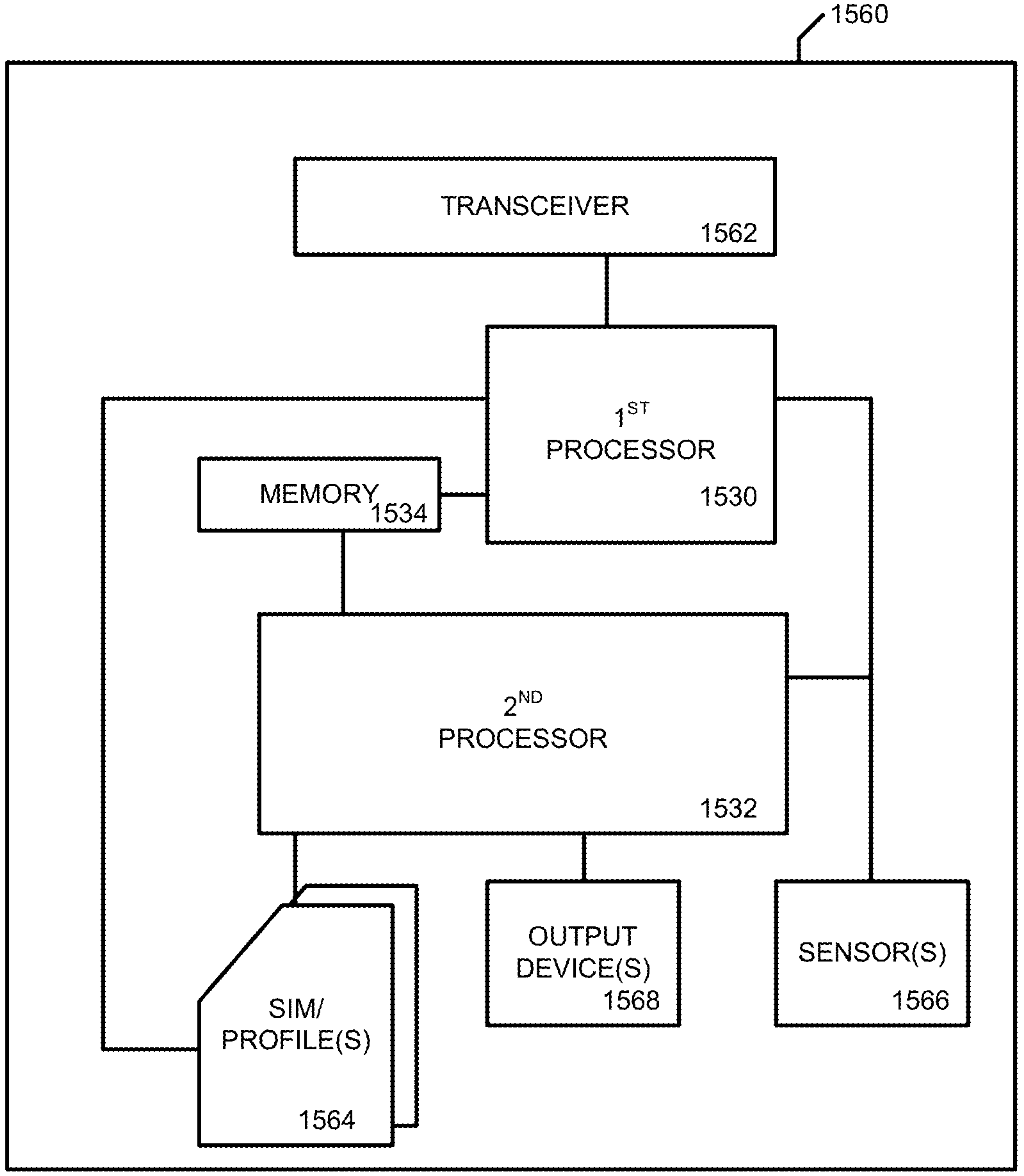
FIG. 15 illustrates a block diagram of an example wireless user equipment.

Turning now to FIG. 15, the figure illustrates a block diagram of an example UE 1560. UE 1560 may comprise a smart phone, a wireless tablet, a laptop computer with wireless capability, a wearable device, a machine device that may facilitate vehicle telematics, and the like. UE 1560 comprises a first processor 1530, a second processor 1532, and a shared memory 1534. UE 1560 includes radio front end circuitry 1562, which may be referred to herein as a transceiver, but is understood to typically include transceiver circuitry, separate filters, and separate antennas for facilitating transmission and receiving of signals over a wireless link, such as one or more wireless links 125, 135, or 137 shown in FIG. 1. Furthermore, transceiver 1562 may comprise multiple sets of circuitry or may be tunable to accommodate different frequency ranges, different modulations schemes, or different communication protocols, to facilitate long-range wireless links such as links, device-to-device links, such as links 135, and short-range wireless links, such as links 137.

Continuing with description of FIG. 15, UE 1560 may also include a SIM 1564, or a SIM profile, which may comprise information stored in a memory (memory 1534 or a separate memory portion), for facilitating wireless communication with RAN 105 or core network 130 shown in FIG. 1. FIG. 15 shows SIM 1564 as a single component in the shape of a conventional SIM card, but it will be appreciated that SIM 1564 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1564 and another device, which may be a component of RAN 105 or core network 130 shown in FIG. 1). A SIM profile 1564 may also comprise identifying information that is unique to the SIM, or SIM profile, such as, for example, an International Mobile Subscriber Identity ("IMSI") or Information that may make up an IMSI.

SIM 1564 is shown coupled to both the first processor portion 1530 and the second processor portion 1532. Such an implementation may provide an advantage that first processor portion 1530 may not need to request or receive information or data from SIM 1564 that second processor 1532 may request, thus eliminating the use of the first processor acting as a "go-between" when the second processor uses information from the SIM in performing its functions and in executing applications. First processor 1530, which may be a modem processor or baseband processor, is shown smaller than processor 1532, which may be a more sophisticated application processor, to visually indicate the relative levels of sophistication (i.e., processing capability and performance) and corresponding relative levels of operating power consumption levels between the two processor portions. Keeping the second processor portion 1532 asleep/inactive/in a low power state when UE 1560 does not need it for executing applications and processing data related to an application provides an advantage of reducing power consumption when the UE only needs to use the first processor portion 1530 while in listening mode for monitoring routine configured bearer management and mobility management/maintenance procedures, or for monitoring search spaces that the UE has been configured to monitor while the second processor portion remains inactive/asleep.

UE 1560 may also include sensors 1566, such as, for example, temperature sensors, accelerometers, gyroscopes, barometers, moisture sensors, and the like that may provide signals to the first processor 1530 or second processor 1532. Output devices 1568 may comprise, for example, one or more visual displays (e.g., computer monitors, VR appliances, and the like), acoustic transducers, such as speakers or microphones, vibration components, and the like. Output devices 1568 may comprise software that interfaces with output devices, for example, visual displays, speakers, microphones, touch sensation devices, smell or taste devices, and the like, that are external to UE 1560.

The following glossary of terms given in Table 1 may apply to one or more descriptions of embodiments disclosed herein.

TABLE 1

| Term | Definition |
|---|---|
| UE | User equipment |
| WTRU | Wireless transmit receive unit |
| RAN | Radio access network |
| QoS | Quality of service |
| DRX | Discontinuous reception |
| EPI | Early paging indication |
| DCI | Downlink control information |

TABLE 1-continued

| Term | Definition |
|---|---|
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| UE | User equipment |
| CBR | Channel busy ratio |
| SCI | Sidelink control information |
| SBFD | Sub-band full duplex |
| CLI | Cross link interference |
| TDD | Time division duplexing |
| FDD | Frequency division duplexing |
| BS | Base-station |
| RS | Reference signal |
| CSI-RS | Channel state information reference signal |
| PTRS | Phase tracking reference signal |
| DMRS | Demodulation reference signal |
| gNB | General NodeB |
| PUCCH | Physical uplink control channel |
| PUSCH | Physical uplink shared channel |
| SRS | Sounding reference signal |
| NES | Network energy saving |
| QCI | Quality class indication |
| RSRP | Reference signal received power |
| PCI | Primary cell ID |
| BWP | Bandwidth Part |
| DT | Digital Twin |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising, facilitating, by a user equipment comprising a processor, receiving, from a radio access network node, a user characteristic reporting configuration comprising at least one user characteristic indication indicative of at least one user characteristic;

facilitating, by the user equipment, receiving, from the radio access network node, a user characteristic reporting request comprising at least one characteristic of the at least one user characteristic indicated by the at least one user characteristic indication;

determining, by the user equipment, at least one user action indication indicative of at least one user action corresponding to at least one of the at least one characteristic of the at least one user characteristic indicated by the user characteristic reporting request;

responsive to receiving the user characteristic reporting request, facilitating, by the user equipment, transmitting, to the radio access network node, a user characteristic report comprising the at least one user action indication, and facilitating, by the user equipment, transmitting, to the radio access network node, at least one user characteristic capability indication indicative of at least one user characteristic capability, with respect to the user equipment, to report the at least one characteristic of the at least one user characteristic indication requested via the user characteristic reporting request, wherein the user equipment comprises a digital twin module to facilitate determining the at least one user characteristic capability.

2. The method of claim 1, wherein the at least one user action indication is usable by the radio access network node to schedule resources accommodative of delivery of traffic corresponding to the at least one user action.

3. The method of claim 1, wherein the user characteristic reporting request comprises at least one confidence level indication indicative of at least one confidence level criterion corresponding to the at least one user characteristic indication, the method further comprising:

determining, by the user equipment, the at least one user characteristic according to satisfaction of the at least one confidence level criterion to result in at least one determined user characteristic, wherein the transmitting of the user characteristic report is based on the at least one determined user characteristic satisfying the at least one confidence level criterion corresponding to the at least one user characteristic.

4. The method of claim 3, wherein the user characteristic reporting request comprises at least one configured user characteristic indication duration indication indicative of at least one configured user characteristic indication validity period length during which the at least one confidence level criterion is to be valid with respect to the at least one determined user characteristic.

5. The method of claim 4, wherein the user characteristic report further comprises at least one actual user characteristic indication duration indication indicative of at least one user characteristic indication validity period indication indicative of at least one user characteristic indication validity period during which the at least one confidence level criterion is valid with respect to the at least one determined user characteristic.

6. The method of claim 5, wherein the at least one user characteristic indication validity period indicated in the user characteristic report is less than the at least one configured user characteristic indication validity period length.

7. The method of claim 1, wherein the user characteristic reporting configuration is generated by an extended reality (XR) server.

8. The method of claim 1, wherein an extended reality (XR) appliance comprises the user equipment.

9. The method of claim 1, wherein the user equipment is a component of an extended reality (XR) processing unit communicatively coupled with an XR appliance.

10. The method of claim 1, wherein the at least one user characteristic corresponds to at least one action result resulting from performance of at least one action with respect to use of an extended reality (XR) user interface.

11. The method of claim 10, wherein the at least one action result comprises at least one of: a specified pose orientation, a level orientation, a target acceleration, a target velocity, a specified hand orientation of the user, an eye blink, a target eye blink rate, or a specified orientation with respect to a three-dimensional space.

12. The method of claim 1, wherein the determining of the at least one user action indication comprises:

receiving, from an extended reality (XR) appliance, the at least one user action indication.

13. An extended reality (XR) processing unit comprising:

a processor configured to process executable instructions that, when executed by the processor, facilitate performance of operations, comprising:

receiving, from a radio network node, a user characteristic reporting configuration comprising at least one user characteristic indication indicative of at least one user characteristic;

receiving, from the radio network node, a user characteristic reporting request, comprising at least one characteristic of the at least one user characteristic indicated by the at least one user characteristic indication and at least one confidence level indication indicative of at least one confidence level criterion corresponding to the at least one user characteristic indication;

determining at least one user action prediction indication indicative of at least one predicted user action corresponding to at least one of the at least one characteristic of the at least one user characteristic indicated by the user characteristic reporting request;

responsive to receiving the user characteristic reporting request and based on the at least one user action prediction indication satisfying the at least one confidence level criterion corresponding to the at least one characteristic, transmitting a user characteristic report comprising the at least one user action indication, and transmitting, to the radio network node, at least one user characteristic capability indication indicative of at least one user characteristic capability, with respect to the user equipment, to determine the at least one user action prediction indication, wherein the at least one user action prediction indication is determined by a digital twin module.

14. The extended reality processing unit of claim 13, wherein the user characteristic reporting request comprises at least one configured user characteristic indication duration indication indicative of at least one configured user characteristic indication validity period length during which the at least one confidence level criterion is to be valid with respect to the at least one determined user characteristic.

15. The extended reality processing unit of claim 14, wherein the user characteristic report further comprises at least one actual user characteristic indication duration indication indicative of at least one user characteristic indication validity period indication indicative of at least one user characteristic indication validity period during which the at least one confidence level criterion is valid with respect to the at least one determined user characteristic.

16. The extended reality processing unit of claim 15, wherein the at least one user characteristic indication validity period indicated in the user characteristic report is less than the at least one configured user characteristic indication validity period length.

17. The extended reality processing unit of claim 13, wherein the at least one user action indication is usable by the radio access network node to schedule resources to facilitate delivery of traffic corresponding to the at least one predicted user action.

18. A non-transitory machine-readable medium, comprising executable instructions that, when executed by a processor of an extended reality (XR) processing unit, facilitate performance of operations, comprising:

receiving, from a radio network node, a user characteristic reporting configuration comprising at least one user characteristic indication indicative of at least one user characteristic;

receiving, from the radio network node, a user characteristic reporting request comprising at least one indication of the at least one user characteristic indication, wherein the user characteristic reporting request comprises at least one confidence level indication indicative of at least one confidence level criterion corresponding to the at least one user characteristic indication;

receiving, from an XR appliance, at least one user action indication indicative of at least one user action corresponding to at least one of the at least one user characteristic indicated by the user characteristic reporting request;

based on the at least one user action indication, determining at least one user characteristic prediction that satisfies the at least one confidence level criterion to result in a user characteristic prediction satisfaction result;

responsive to receiving the user characteristic reporting request, transmitting, to the radio network node, a user characteristic report comprising the user characteristic prediction satisfaction result; and transmitting, to the radio network node, at least one user characteristic capability indication indicative of at least one user characteristic capability, with respect to XR appliance, to report to the XR processing unit the at least one of the at least one user characteristic indication indicated by the user characteristic reporting configuration, wherein the at least one user characteristic indication is determined by a digital twin module.

19. The non-transitory machine-readable medium of claim 18, wherein the user characteristic report further comprises at least one actual user characteristic indication duration indication indicative of at least one user characteristic prediction validity period during which the at least one confidence level criterion is valid with respect to the user characteristic prediction satisfaction result.

20. The non-transitory machine-readable medium of claim 18, wherein the at least one user action indication is usable by the radio access network node to schedule resources to facilitate delivery of traffic corresponding to the at least one user action.

* * * * *